Jan. 17, 1967  P. E. MERCIER  3,298,709
SUSPENSION EQUIPMENT FOR VEHICLES
Filed Feb. 4, 1964  18 Sheets-Sheet 1

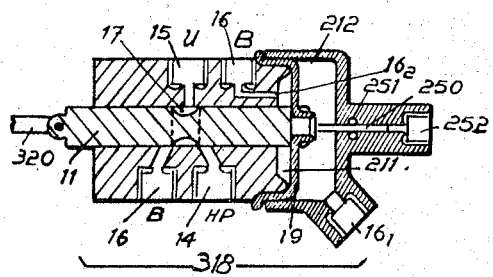
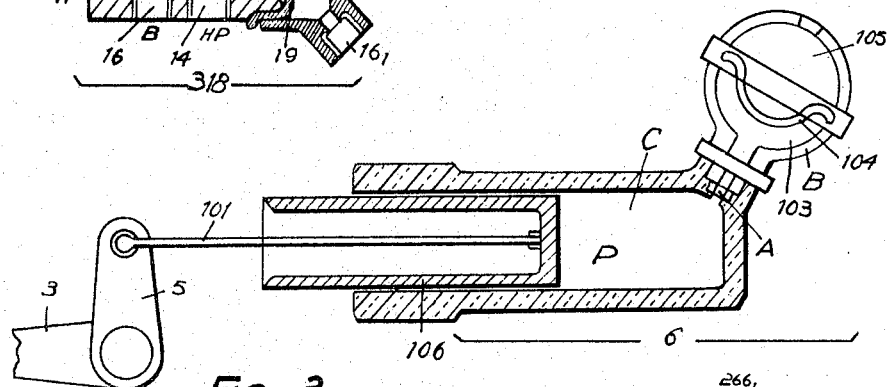
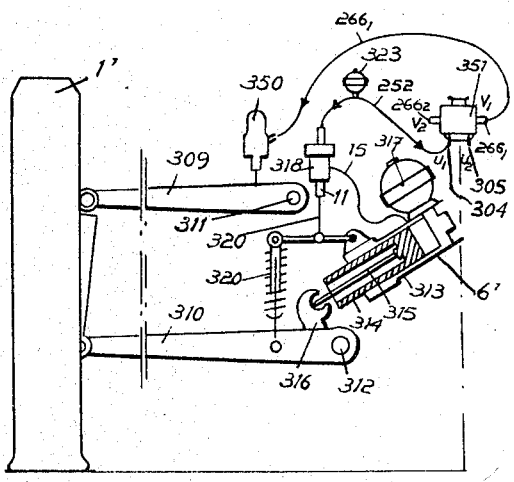
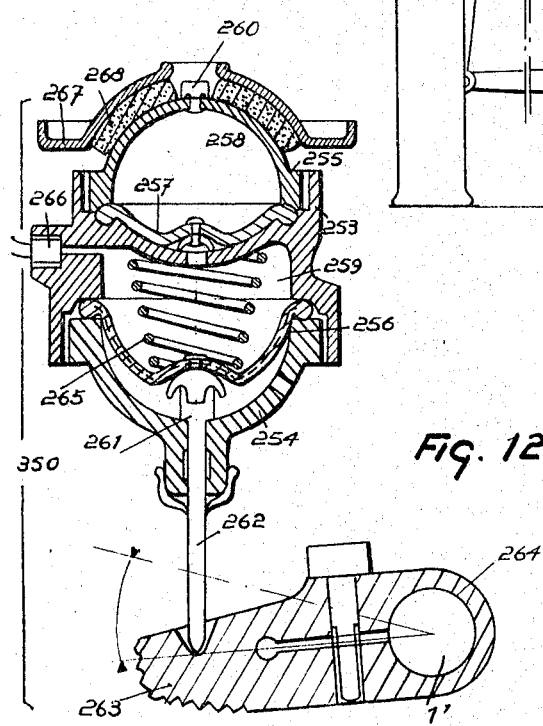

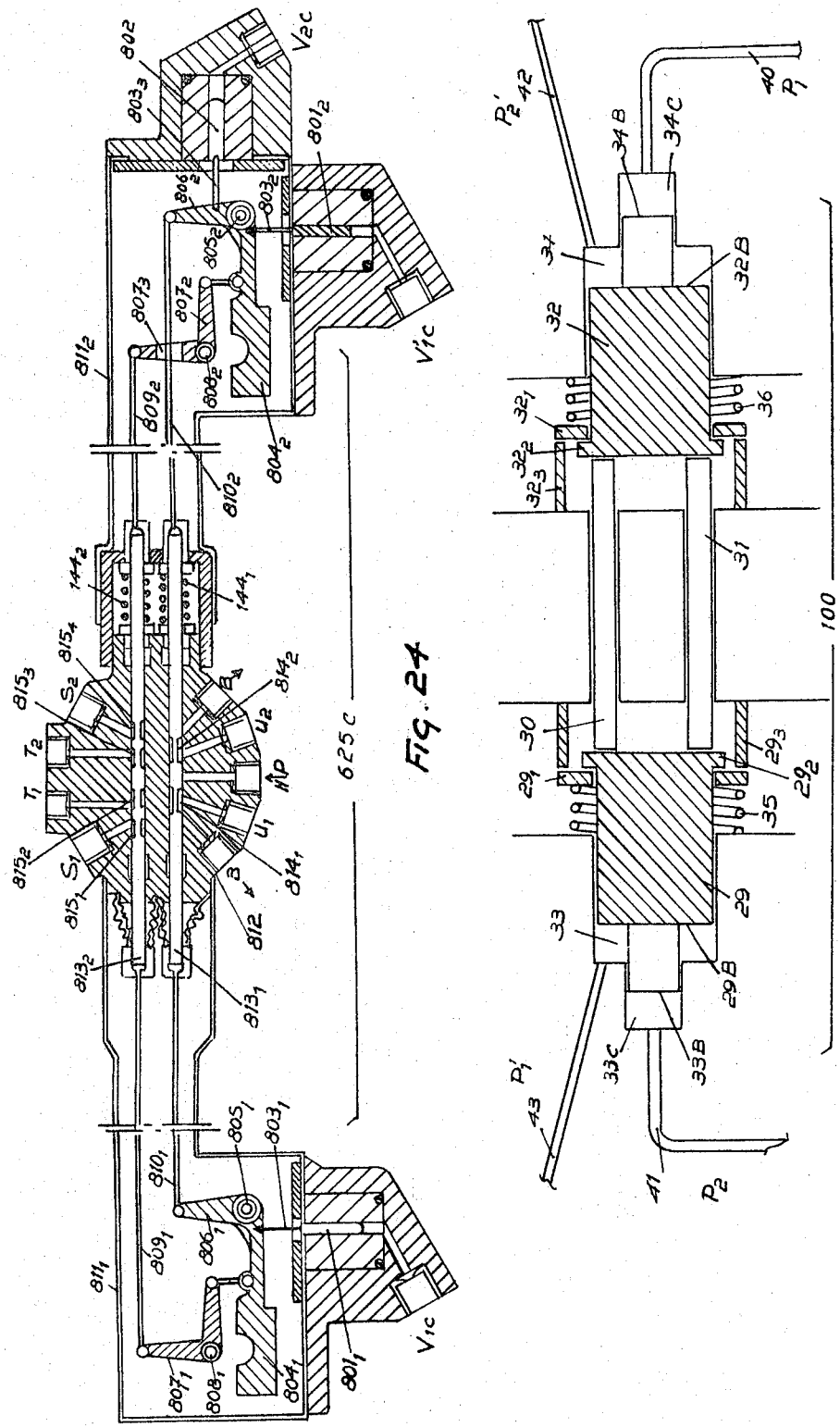

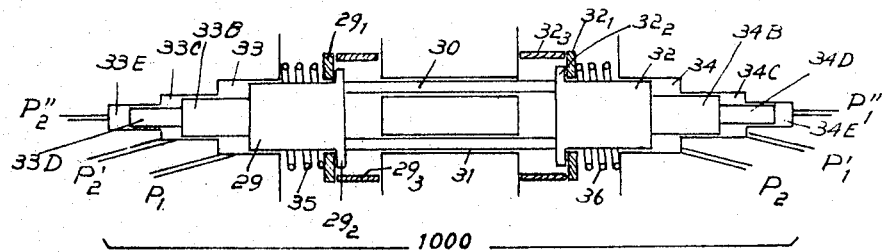
Fig. 9
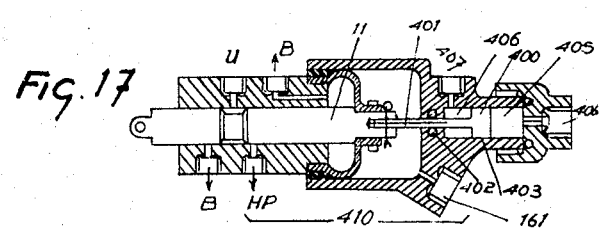
Fig. 23
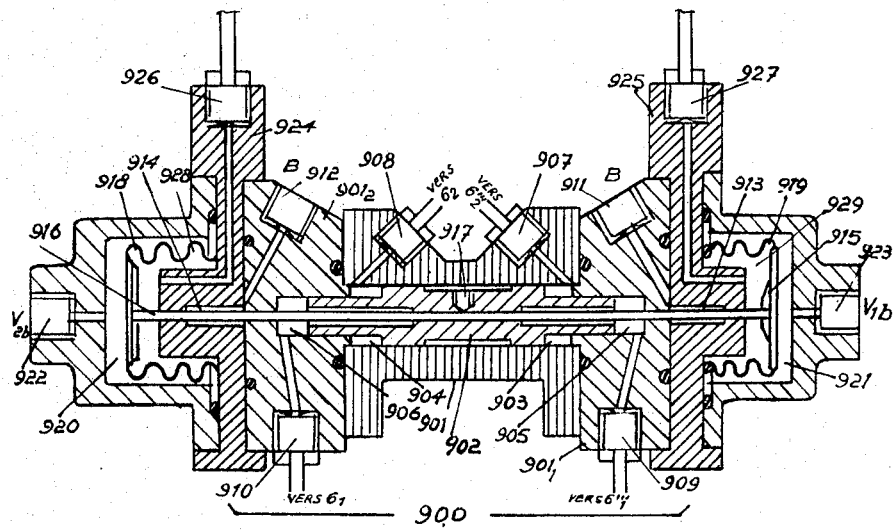
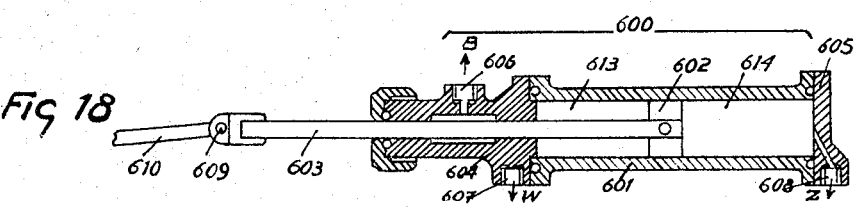
Fig 18

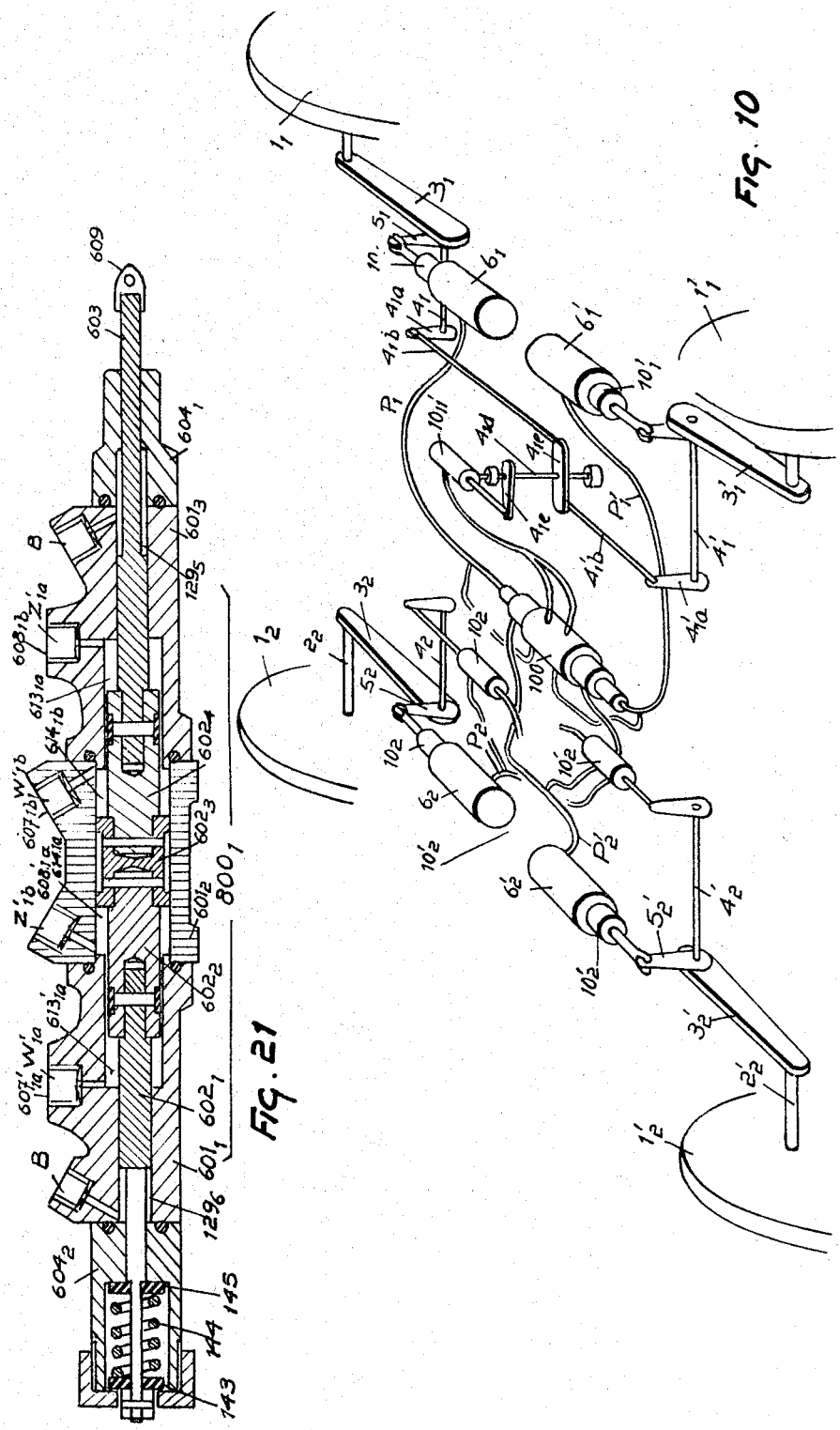

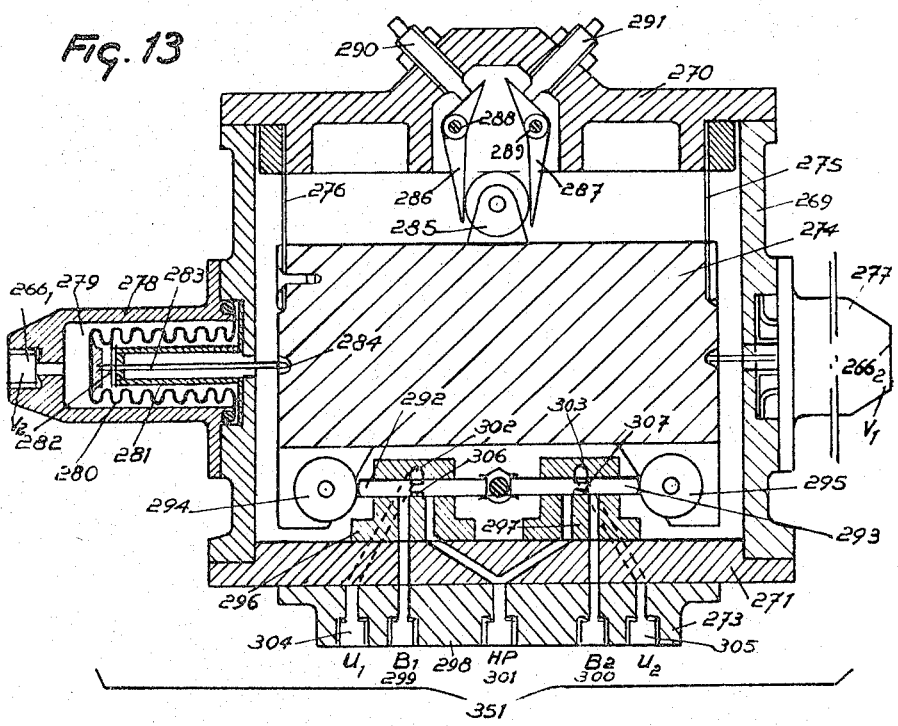
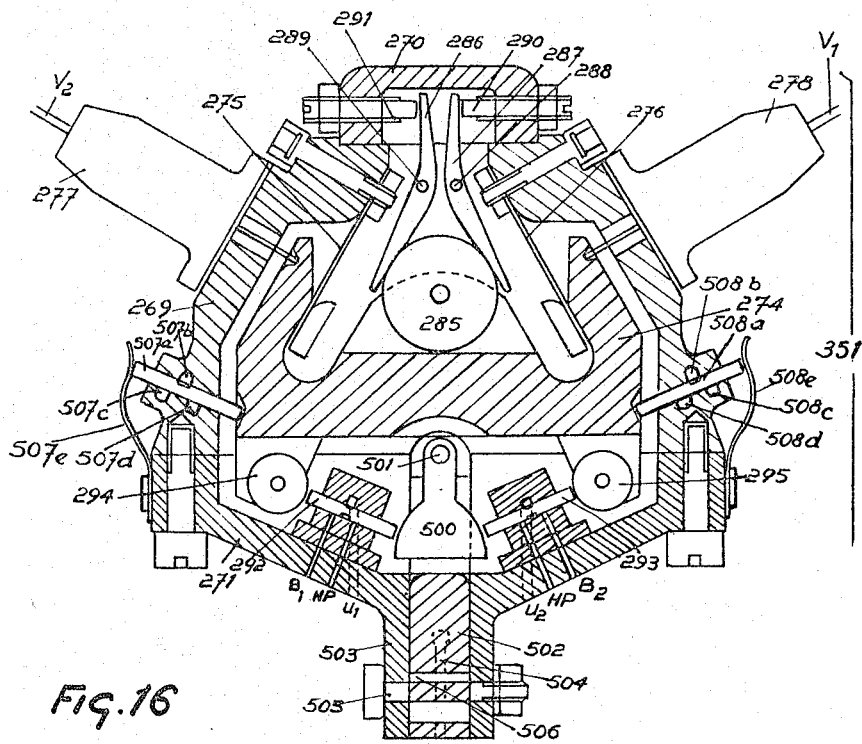

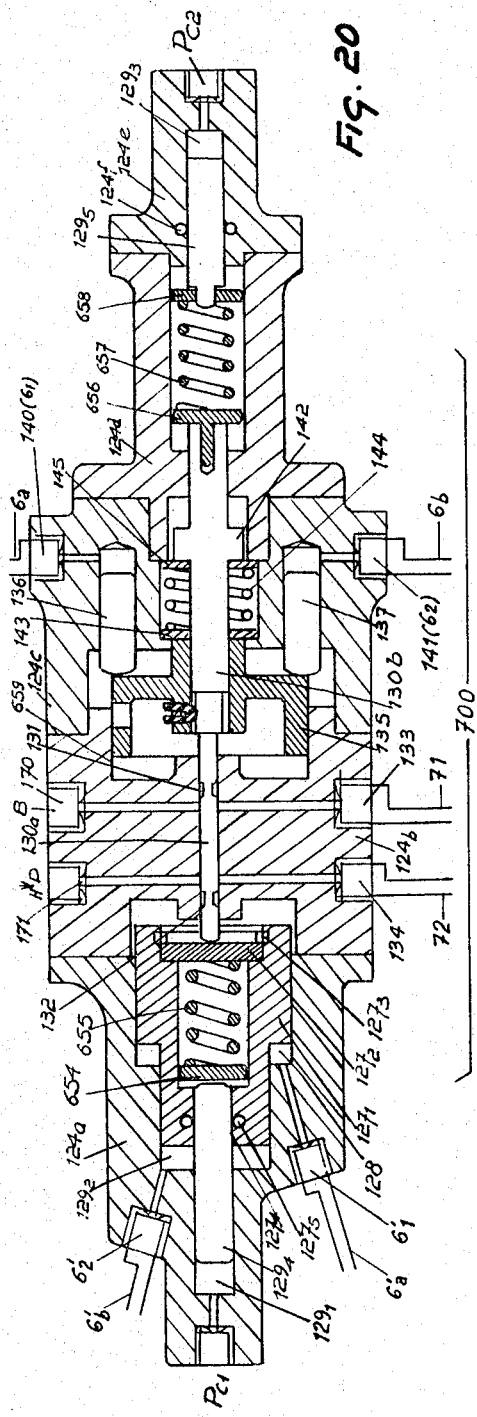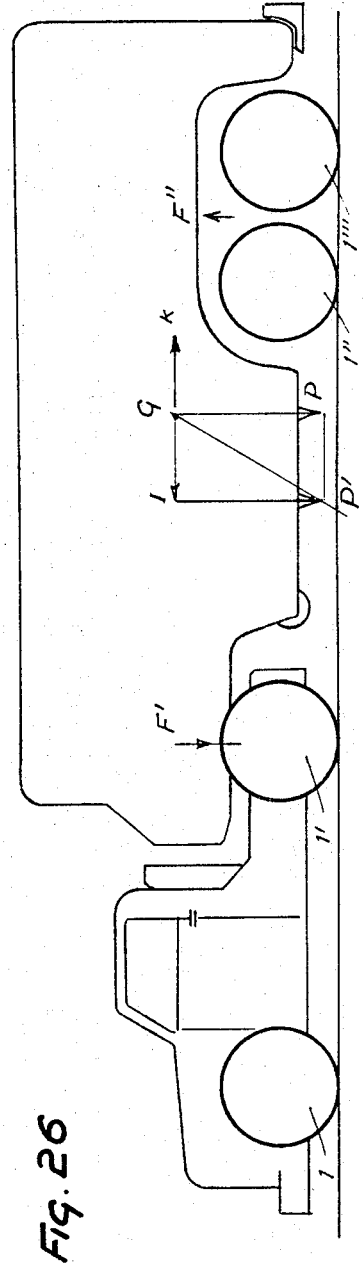

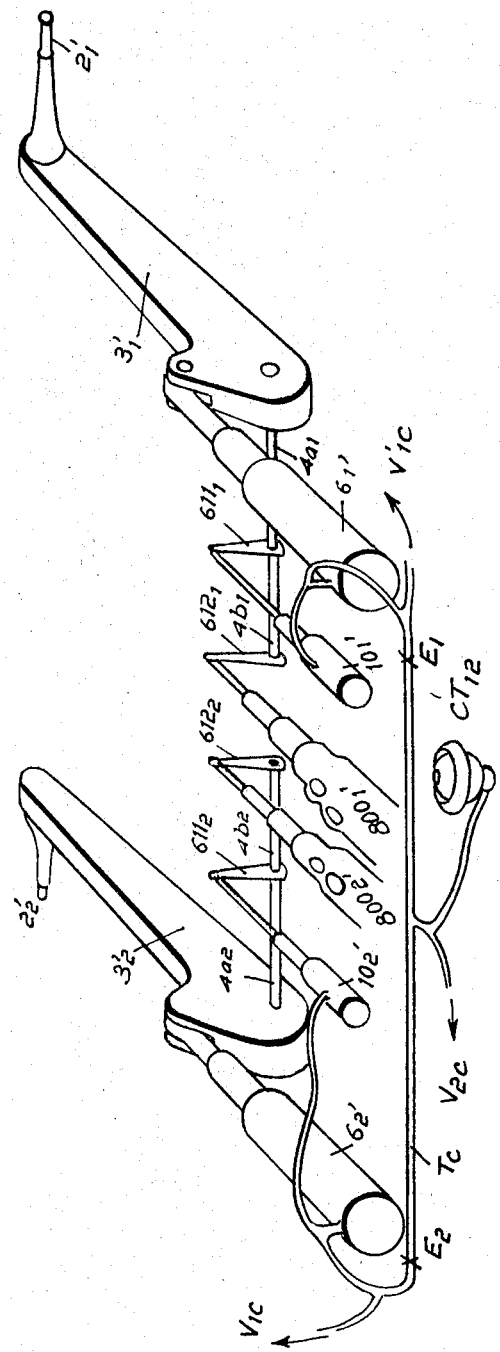

United States Patent Office 3,298,709
Patented Jan. 17, 1967

3,298,709
SUSPENSION EQUIPMENT FOR VEHICLES
Pierre Ernest Mercier, 1 Rte. de Saint Brice,
Piscop by Saint Brice, France
Filed Feb. 4, 1964, Ser. No. 342,479
Claims priority, application France, Mar. 14, 1959,
789,394, Patent 1,222,016
3 Claims. (Cl. 280—104)

This is a continuation-in-part of application, Serial No. 14,655 filed March 14, 1960 now abandoned.

Hydraulic or hydro-pneumatic vehicle suspension systems are already known, which systems comprise a suspension number including a mechanically deformable fluid-filled space, attached, on the one hand, to the axle or wheel, and on the other, to the suspended vehicle (i.e., to the chassis of the vehicle), a cavity containing an elastic medium and a damping means including automatic control means to permit and control the passage of fluid from the mechanically deformable space to the cavity containing an elastic medium and vice versa.

These suspension members are generally arranged at points where a vehicle bears on the ground (i.e., bearing points), so that each of the bearing points are connected by mobile members to the suspended chassis.

In such a suspension system for the vehicles comprising more than three bearing points, the distribution of the loads borne by the mobile members depends on the pressure of the fluid in each of the mechanically deformable spaces.

One of the objects sought in effecting an efficient suspension of a vehicle consists in maintaining certain ratios between the loads borne by the various mobile members, at rest, or when moving, whatever the configuration and condition of the ground or the roads on which the bearing points of the mobile members may move. In particular, when negotiating a bend, the centrifugal torque to which the vehicle may be subjected must be balanced by the mobile members, so as to ensure that the suspension unit will provide the greatest stability or hold on the road whatever the speed at which the vehicle is traveling.

Likewise, for variable load conditions, the stability and road-holding character of a vehicle can be controlled by acting on the pressures prevailing in the mechanically deformable spaces.

One of the objects of the invention is to maintain, in the mechanically deformable spaces of a pair of wheels placed on either side of the longitudinal axis of a vehicle, a pressure difference proportional to that existing in mechanically deformable spaces of suspension members provided for two other wheels situated in like relation to the longitudinal axis and called "control wheels," for the purpose of correcting rolling movements.

In other words, assuming $P'_1$ and $P'_2$ to be the pressures in the mechanically deformable spaces of the suspension members of the two control wheels and $P_1$ and $P_2$ to be the pressures in the suspension members of the two other wheels called controlled wheels, the object of the invention is to effect at any moment $P_1-P_2=kx\ (P'_1-P'_2)$, where $k$ is a constant.

Another object of the invention is the correction of longitudinal or pitching movements, which object is accomplished by establishing in the mechanically deformable spaces of a pair of wheels a pressure proportional to the pressures existing in mechanically deformable spaces of suspension members provided for, on the one hand, a first pair of wheels, and on the other, a second pair of wheels, these pairs of wheels being called control wheels for pitching movements.

In other words, we have: $(P'_1+P'_2)=k_2(P''_1+P''_2)$ and $P_1+P_2=k_1$

Moreover, another object of the invention is to apply to the pressures of the mechanically deformable spaces such as have been described above, corrections for taking into account transverse, longitudinal and vertical accelerations, and eventually other corrections for taking into account the distribution of loads on the chassis of the suspended vehicle.

Suspension equipment for a vehicle according to the invention is shown, by way of example, in the attached drawings, in which:

FIGURE 2 is a sectional elevation of a diagrammatic view of a suspension member of a vehicle wheel;

FIGURE 4 is a section elevation view of a transverse differential corrector;

FIGURE 9 is a sectional view of an alternative embodiment of the transverse differential corrector of FIGURE 4 in the case of response to or control by two pairs of control wheels;

FIGURE 10 is a perspective view of the invention in which the pairs of control wheels and other wheels are respectively placed on either side of the longitudinal axis of a vehicle;

FIGURE 11 is a sectional view of a distributor similar to that of FIGURE 3 used in connection with distributors responsive to a pair of control wheels with an acceleration detector;

FIGURE 12 is a cross section view of a shock absorber or energy absorber;

FIGURE 13 is a sectional elevation view of an acceleration detector;

FIGURE 14 is a diagrammatic view of the suspension system of one of the wheels of a vehicle comprising a shock absorber partially responsive to a transverse acceleration detector;

FIGURE 16 is an elevation section view of another embodiment of an acceleration detector similar to that of FIGURE 11;

FIGURE 17 is a sectional view of an embodiment of a distributor with the addition of a double-acting piston responsive to an acceleration detector, put into operation with hydro-pneumatic or hydro-mechanical spaces;

FIGURE 18 is a longitudinal sectional view of a coupling member of a distributor for adding a simple correction thereto;

FIGURE 20 is a longitudinal view in section of an alternative embodiment of the longitudinal differentiating member of FIGURE 7;

FIGURE 21 is an elevation view in section of a double coupling member connectable to two distributors;

FIGURE 22 is a fragmentary view of a suspension system of a pair of control wheels comprising the combination of individual distributors and double coupling members to the distributors for adding two corrections thereto;

FIGURE 23 is a section elevation view partly in section of a control pressure differentiating member;

FIGURE 24 is a longitudinal sectional view of a detector;

Figure 1:
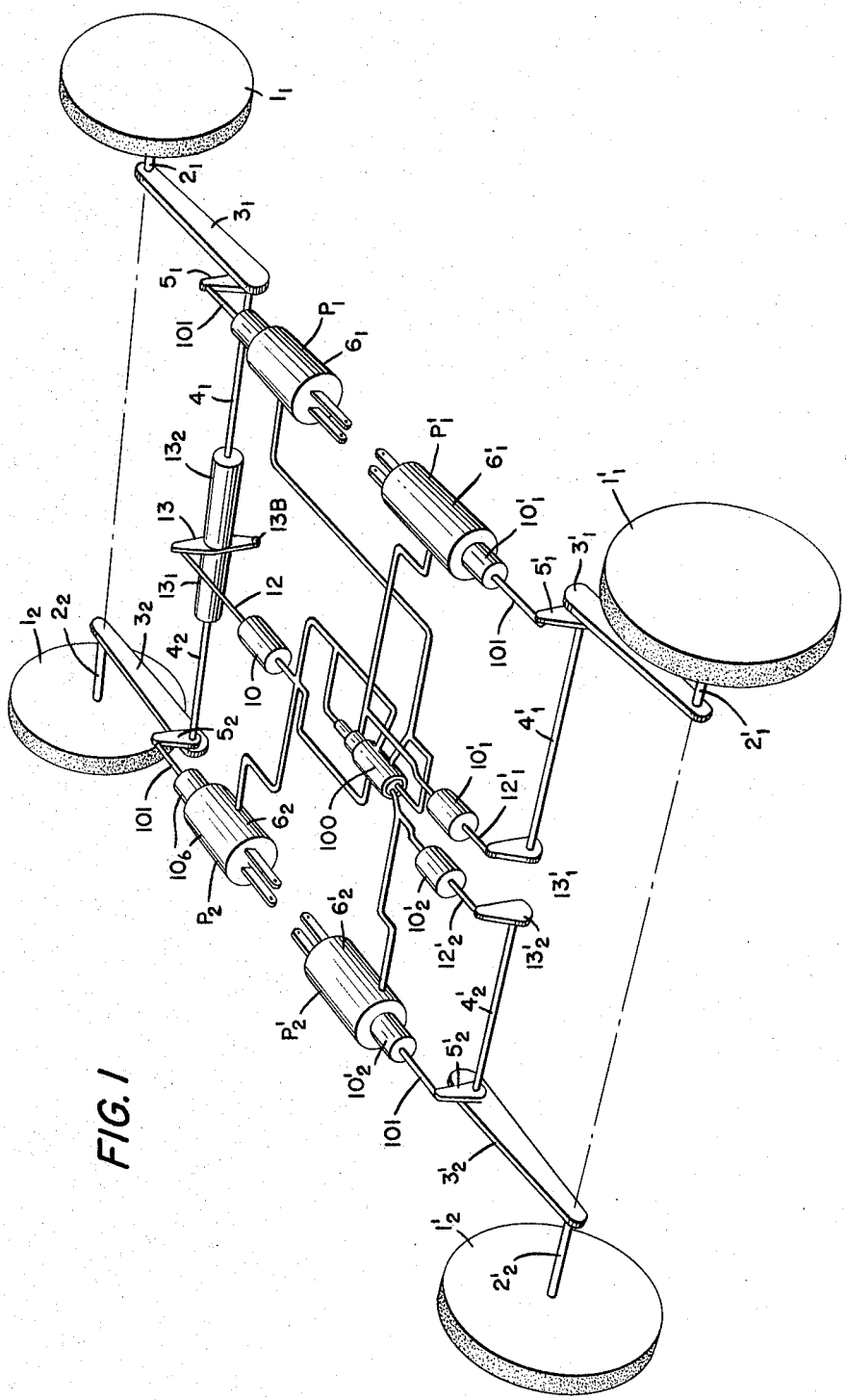
FIGURE 1 is a fragmentary perspective diagrammatic view of a suspension system applied to two pairs of wheels arranged symmetrically in relation to the longitudinal axis of a vehicle.
Figure 25:
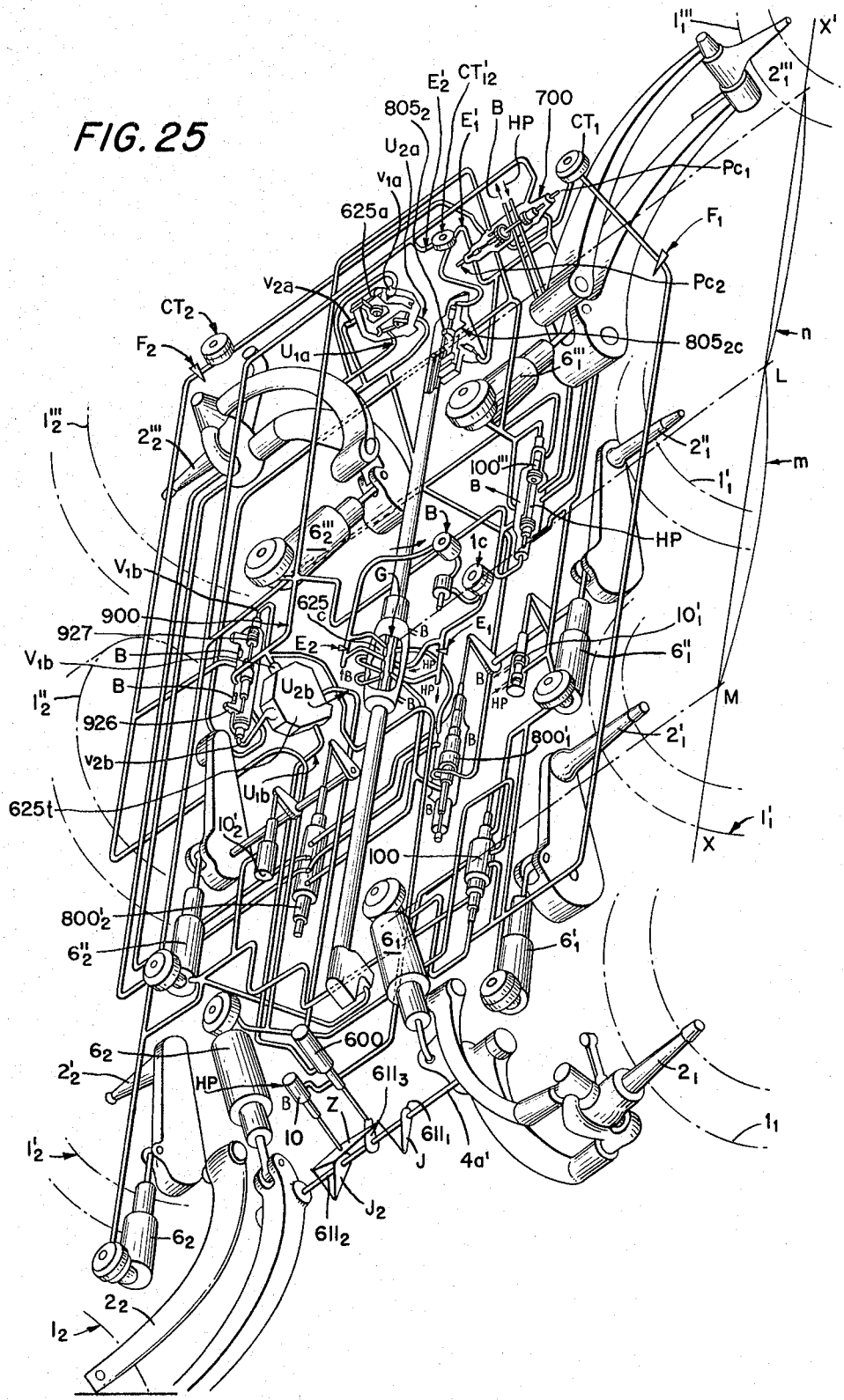
Figure 27:
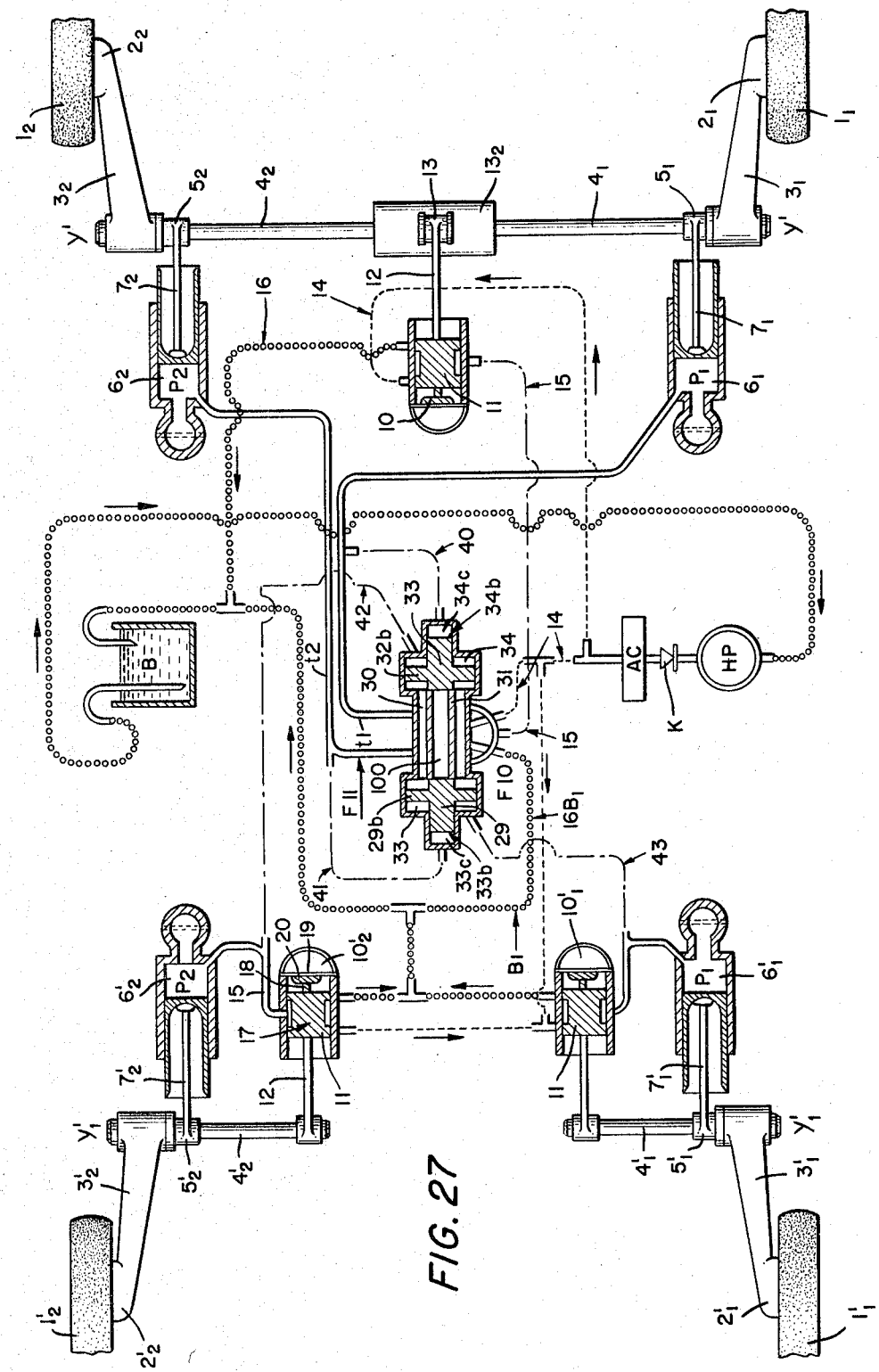
Figure 28:
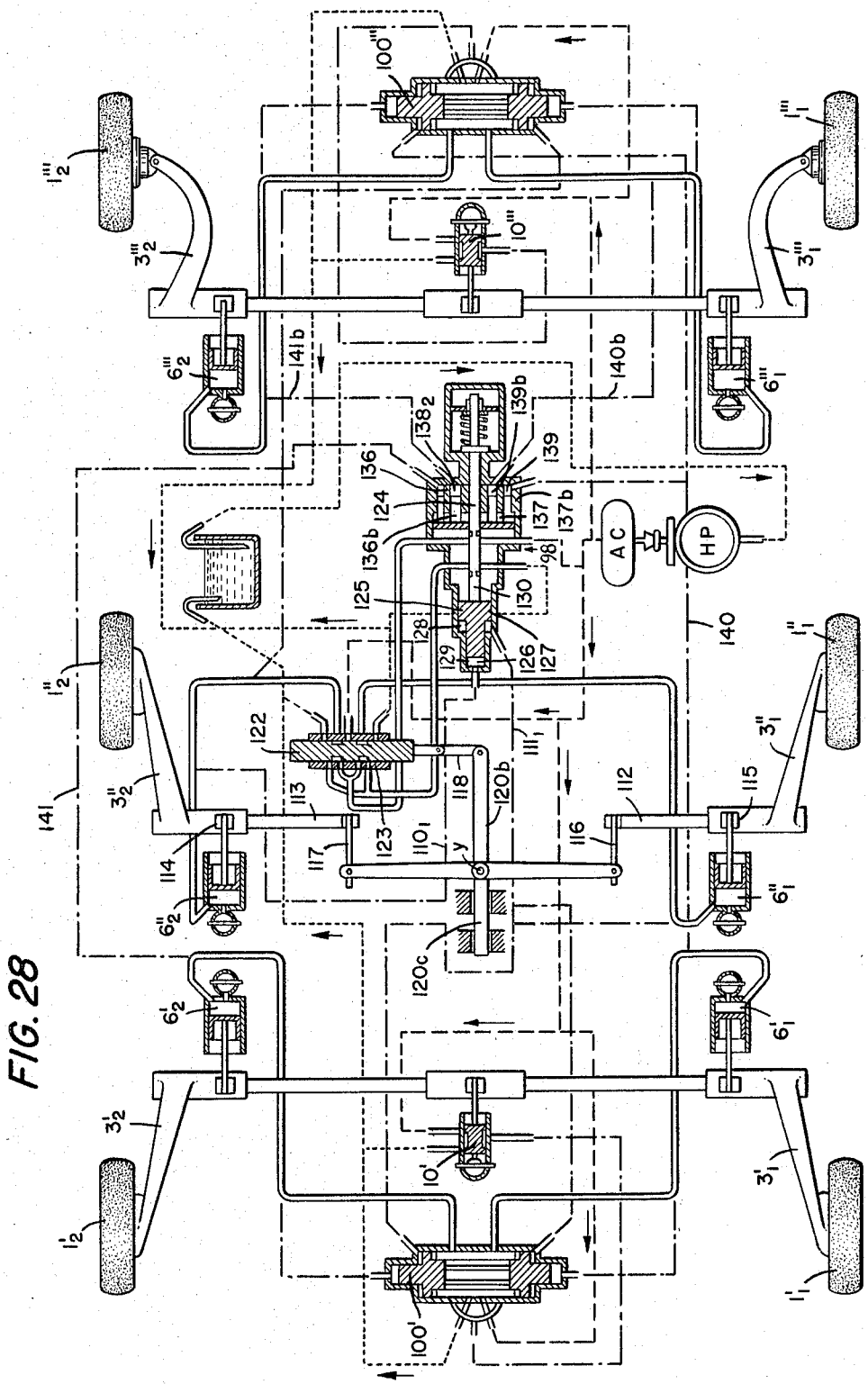
Figure 29:
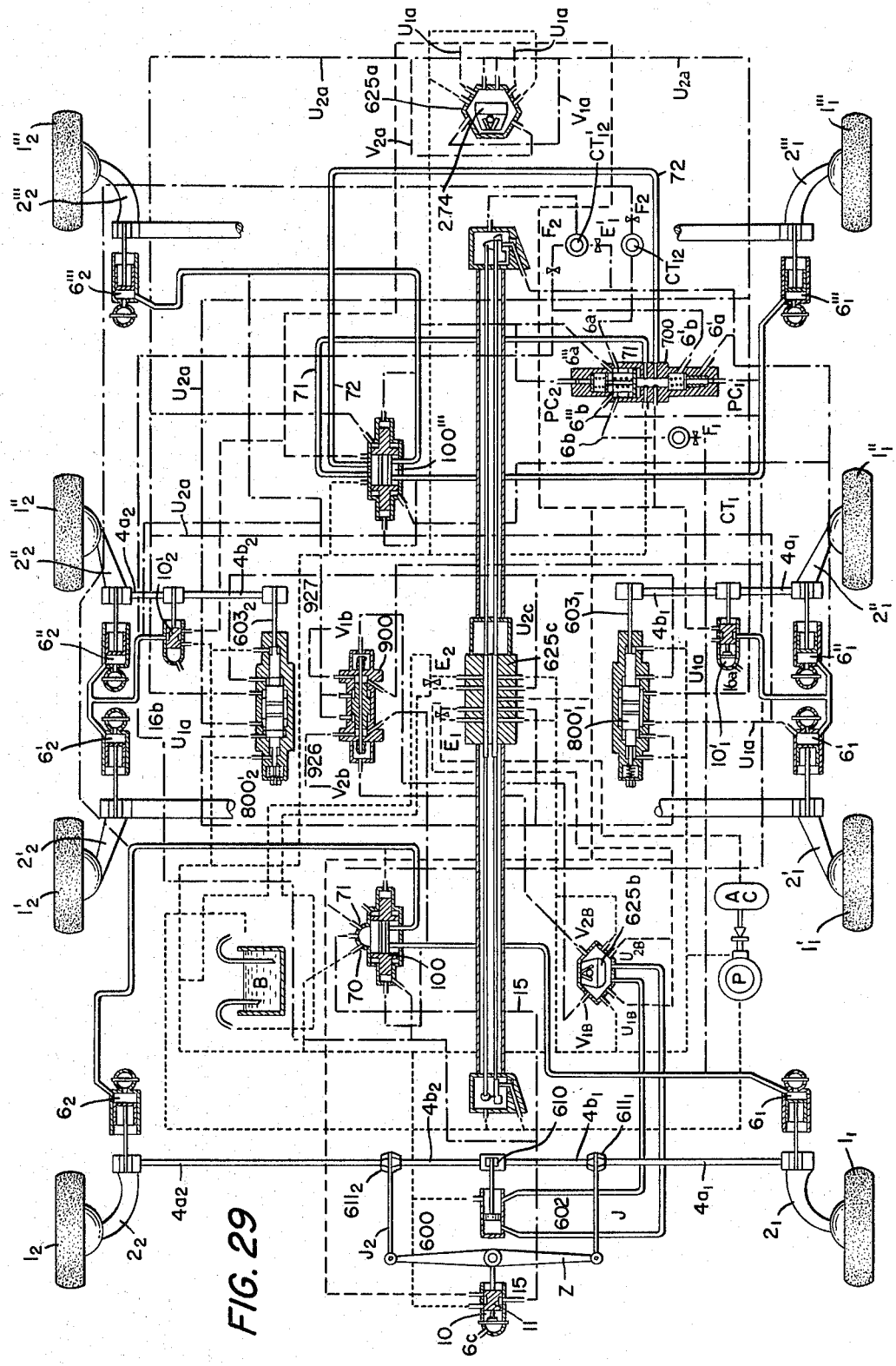

FIGURE 25 is a diagrammatic perspective view of an eight-wheel vehicle chassis suspension system comprising individual suspension members with given static reactions, arranged, according to the invention, by means of longitudinal and transverse differential correctors, also comprising distributors for the control wheels, which system is responsive to transverse, longitudinal and vertical accelerations;

FIGURE 26 is a side view of a tractor and its semitrailer for illustrating principles of the invention;

FIGURE 27 is the diagram of the hydraulic linkages between the various members of the suspension system of FIGURE 1;

FIGURE 28 is the diagram of the hydraulic linkages for a six-wheeled vehicle;

FIGURE 29 is the diagram of hydraulic linkages between the various members of the suspension system of an eight-wheeled vehicle shown in FIGURE 25.

FIGURE 1 shows digrammatically the suspension system of a pair of wheels $1_1$, $1_2$ placed symmetrically in relation to the longitudinal axis of a vehicle.

The axles $2_1$, $2_2$ of each of the wheels $1_1$, $1_2$ are supported in the usual manner by oscillating arms $3_1$, $3_2$ respectively connected to torsion bars $4_1$, $4_2$ of low inertia. The rotation of each of the arms $3_1$, $3_2$ under the action of an unevenness of the road surface is communicated by levers $5_1$, $5_2$ to the suspension members $6_1$, $6_2$ which balances the action of the weight borne by the wheels.

Each suspension member 6 comprises, for example (FIGURE 2) a piston 106 connected by its rod 101 to the lever 5 and moving in a stabilizing cylinder C filled with liquid (FIG. 2) and connected to the suspended vehicle. This cylinder C communicates with a damping member A with a cavity B containing an elastic mass (this elastic mass is formed, for example, of a liquid 103 in contact with a deformable cover 104 containing a gas 105).

In each suspension member 6, the pressure P prevailing in the cylinder C is variable as a function of the vertical movements of the wheel connected to the suspension member. It controls the operating of the suspension.

Figure 3:
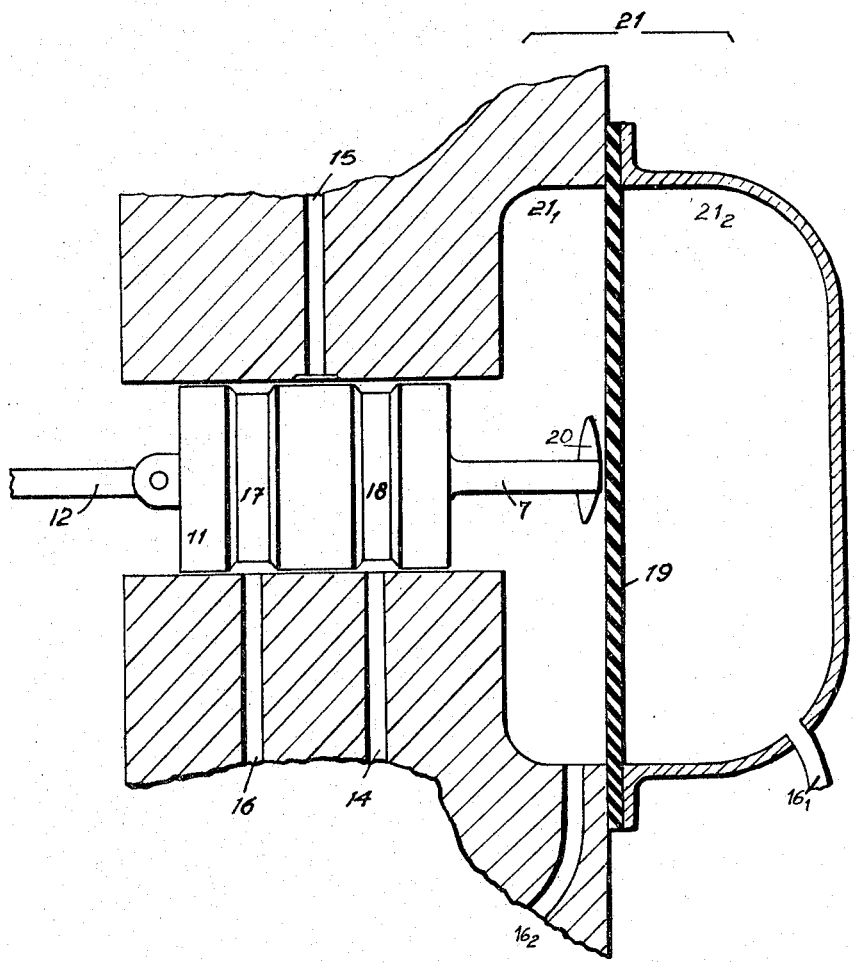
FIGURE 3 is illustrative of an example of a distributor.

According to the invention, these pressure $P_1$ for the wheel $1_1$ and $P_2$ for the wheel $1_2$ are subjected:

(a) on the one hand, to a corrective control member which has as its output the mean deflection of the arms 3 in relation to the suspended mass and termed distributor 10 (FIGURE 3). The output of the distributor 10 is the mean average of the deflections of the arms 3, and $3_2$ which are rigidly connected to low inertia torsion bars $4_1$, $4_2$, respectively (FIGURE 1);

(b) on the other hand, to a transverse differential corrector 100 (FIGURE 4) responsive to transverse moments and reproducing, between the respective pressures of said suspension members $6_1$ and $6_2$, a pressure difference as a function of that which exists between the suspension members $6'_1$ and $6'_2$ of another pair of wheels $1'_1$ and $1'_2$ which are control wheels.

The control wheels $1'_1$ and $1'_2$ can be arranged like the wheels $1_1$ and $1_2$. The axles $2'_1$ and $2'_2$ of the control wheels $1'_1$ and $1'_2$ are supported in like manner by oscillating arms $3'_1$ and $3'_2$ which are rigidly connected to torsion bars $4'_1$, $4'_2$, respectively. The rotation of each of the torsion bars $3'_1$, $3'_2$ under the action of the unevenness of road surfaces is communicated by the levers $5'_1$, $5'_2$ to the suspension members $6'_1$, $6'_2$ similar to those of the wheels $1_1$, $1_2$. Moreover, each wheel $1'_1$ and $1'_2$ is associated with a distributor $10'_1$, $10'_2$ (FIGURE 3).

The response of the wheels $1_1$ and $1_2$ to the control wheels $1'_1$ and $1'_2$ enables, in particular, the level of the suspended vehicle to be controlled in a transverse direction.

For a significant pressure difference that may appear between the suspension members $6_1$, $6_2$ or $6'_1$, $6'_2$ the transverse differential corrector 100, according to the invention, can act in series with the distributor 10; that is to say, that if the arms $3_1$, $3_2$ have deflected significantly, the distributor 10 sends liquid under pressure into the transverse differential corrector 100 which distributes it, unequally, if so required, between the suspension members $6_1$, $6_2$ until differentiated pressures are obtained in these members proportional to the differentiated pressures prevailing in the suspension members $6'_1$, $6'_2$, the mean value of the first-mentioned differentiated pressures being that which imparts to the control wheels the pressure that the transverse differential corrector or distributor must re-establish.

In the case where the significant pressure difference to be corrected appears between the suspension members $6_1$, $6_2$, on the one hand and $6'_1$, $6'_2$, on the other hand, and the mean output pressure of the suspension members $6_1$, $6_2$ is normal, it will be subsequently explained that the transverse differential corrector 100 is provided with slide-valves which operate in a manner such that the additions or subtractions of liquid under pressure in the system do not pass through the distributor 10.

In both cases, the operations of the system of the invention thus eliminates automatically the load variations at the level of the pair of members considered, which may arise from the unevenness of the surface carrying the vehicle.

According to one embodiment of the invention, the distributor 10 (and, likewise, $10'_1$ and $10'_2$) is formed by a slide-valve 11 controlled by a rod 12 connected to a lever 13 and, as a function of the position of the slide-valve 11, the distributor 10 sends fluid under pressure introduced through a conduit 14 towards the transverse differential corrector 100 through a conduit 15, or, on the contrary, the distributor 10 puts the transverse differential corrector 100 into communication through the conduit 15 and a conduit 16 with a low pressure tank. For effecting these transfers of fluids, the slide-valve has a single groove 17.

The position of the slide-valve 11 with respect to controlled wheels $1_1$ and $1_2$ is determined by the balance that is set up between the opposing elastic actions constituting:

(a) the action of the torsion bars $4_1$, $4_2$ which are of small section and tend, by means of a rod 12, to thrust the slide-valve 11 towards an elastic diaphragm 19 (FIG. 3).

(b) the action of a fluid under pressure enclosed in a chamber $21_2$ or the action of an adjustable spring substituted for this fluid.

The elastic diaphragm 19 acts on a plate 20 terminating a rod 7 integral with the slide-valve 11. By its face opposite to the diaphragm $21_2$, the diaphrgam 19 confines a compartment $21_1$ continually in communication with the tank through the conduit $16_2$, whereas the pressure acting on the diaphragm 19 by its face opposed to the slide-valve 11, is regulated by the pressure of the fluid introduced through the conduit $16_1$. In an equivalent manner, this action of the fluid can be replaced by the adjustable action of a spring.

One embodiment of the transverse differential corrector 100 is shown in FIGURE 4. It consists of two slide-valves 30 and 31 effecting the distribution of the fluid under pressure to or the evacuation of the fluid from the mechanically deformable spaces of the suspension members 6 or the discharge towards the tank of the fluid coming from those spaces.

The control of the slide-valves 30 and 31 is effected by two pistons 29 and 32 placed on either side of the slide-valves 30 and 31. Each piston 29 or 32 includes a central piston $33_b$ or $34_b$ confining cavities 33, 34, $33_c$, $34_c$. This assembly of pistons is subjected to the action of differential forces resulting from the pressures prevailing in the mechanically deformable spaces of the suspension members 6, as will subsequently be explained. Springs 35 and 36 have the object of returning the slide-valves 30 and 31 to their mean position in the absence of any differential hydraulic action. For effecting a proper return to this mean position, the bearing cups $29_1$, $32_1$ of the springs 35 and 36 are mounted loosely on the pistons 29 and 32, and transmit their action to these pistons by means of shoulder pieces 29 and 32 borne by said pistons.

In the rest position of the pistons 29 and 32, the external edges of the cups $29_1$ and $32_1$ are in contact with fixed bearing rings $29_3$ and $32_3$.

As soon as the pistons 29 and 32 move, they are no longer impelled other than by the springs 35 and 36 which their movement tends to compress and the initial tension of which can be selected independently from its flexibility on this side of its load. The elastic device thus formed therefore provides a still recoil.

Figure 5:
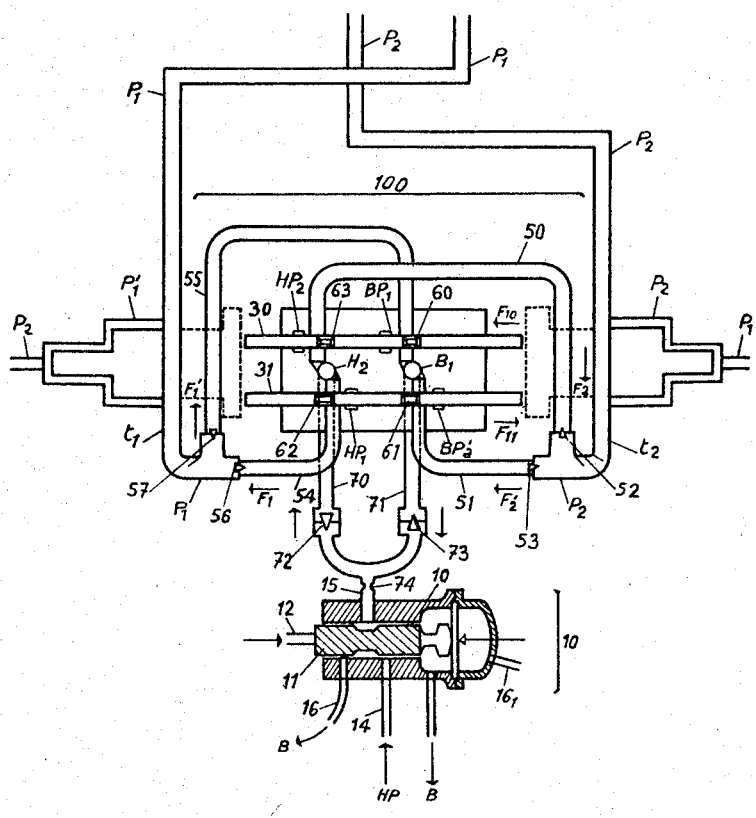
FIGURE 5 is a diagrammatic view of an equalizer and is illustrative of the distribution of fluids effected by the slide-valves of the transverse differential corrector of FIGURE 4 associated with the distributor of FIGURE 3.

The operation of the suspension system of FIGURE 1 comprising suspension members 6 shown in FIGURE 2, distributors 10 shown in FIGURE 3 and a differentiating member 100 shown in FIGURE 4 is diagrammatically explained in FIGURE 5 and FIGURE 27 in which:

Dotted lines indicate conduits communicating with the high pressure liquid source HP with its accumulator AC and the valve K (high pressure circuits);

Dotted lines show the direct conduit communicating with the tank B (low pressure circuits);

Broken lines shows the transmission conduits for liquids ensuring the displacement of the fluid distribution members (slide-valves) that are found in the various devices used (e.g., distributors and differentiating members); these are control circuits;

Double continuous lines show the transmission conduits for liquids in use, i.e., liquids which fiinally flow into the mechanically deformable spaces or cavities C of the suspension members 6 and which flow from these cavities for respectively increasing or reducing pressure in the cavities C; these are utility circuits.

The subscript numeral 1 denotes the pressures corresponding to one side of the vehicle and the subscript numeral 2 denotes the pressures corresponding to the other side of the vehicle. The reference letter P' designates the pressures prevailing in the mechanically deformable cavities of the suspension members $6_1$ and $6_2$.

Therefore $P'_1$ and $P'_2$ denote the pressures in the mechanically deformable spaces of the suspension members $6'_1$, $6'_2$ of the two control wheels $1'_1$ and $1'_2$, the subscript numeral 1 referring for instance, in the drawing (FIGURE 1) to the left wheel and the subscript numeral 2 to the right wheel.

Similarly $P_1$ and $P_2$ denote the pressures in the mechanically deformable spaces of the suspension members of the controlled wheels $1_1$ and $1_2$, the subscript numeral 1 denoting, in the drawing, the left wheel and the subscript numeral 2 the right wheel.

The distributors $10'_1$ and $10'_2$ of which the position of the slide-valve is linked up to the position of the arms $3'_1$ and $3'_2$, respectively, are operatively connected to the mechanically deformable cavity C of the suspension members $6'_1$ and $6'_2$, respectively. The slide-valve 11 of each of the distributors $10'_1$ and $10'_2$ ensures the distribution of the liquid under pressure coming from the high pressure liquid source HP to said cavities C or the drawing off of liquid from the cavities C and the return of the liquid to the tank B.

The distributor 10, of which the position of the slide-valve 11 is linked up to the mean position of the arms $3_1$, $3_2$, is connected, on the one hand, by the conduit 14 to the high pressure liquid source HP and by the conduit 16 to the tank B and, on the other hand, by the conduit 15 to the transverse differential corrector 100.

FIGURE 5 is a diagram of fluid distribution for utility purposes effected by the slide-valves 30 and 31 with the transverse differential corrector 100 shown in a neutral position.

A conduit 50 distributes fluid in the direction of the arrow $F_2$ when it is necessary to increase the pressure $P_2$, or a conduit 51 distributes the fluid in the direction of the arrow $F'_2$ when it is necessary to reduce the pressure $P_2$. The direction of flow of the fluid in each of the conduits 50 and 51 is controlled respectively by the one-way valves 52 and 53. The conduit 50 ends at point $H_2$ passing fluid through a small aperture check, the slide-valve being at rest. The fluid passes through a large aperture when the slide-valve moves in the direction of the arrow $F_{10}$ for putting in communication, through the groove 63, the conduit 50 with the point $H_2$ or, further on, with the groove $HP_2$ which is directly connected to the high pressure liquid source HP. The conduit 51 ends at a point $B_1$, passing fluid through the small aperture check, when the slide-valve 31 is at rest and through a large aperture when the slide-valve moves in the direction of the arrow $F_{11}$ for putting into communication, through the groove 61, the conduit 51 with the point $B_1$ or, further on, with the groove $BP_2$ which is directly connected to the tank B.

A conduit 54 distributes fluid in the direction of the arrow $F_1$ when it is necessary to increase the pressure $P_1$ or a conduit 55 distributes fluid in the direction of the arrow $F'_1$ when it is necessary to reduce the pressure $P_1$. The direction of flow of the fluid in each of the conduits 54 and 55 is respectively controlled by a check-valve 56 and 57. The conduit 54 terminates at point $H_2$ when the slide-valve 31 is at rest and therefore provides a small aperture. When the slide-valve moves in the direction of the arrow $F_{11}$, the conduit 54 communicates through the large aperture, provided by the groove 62, with the point $H_2$ and, further on, with the groove $HP_1$ which is directly connected to the high pressure liquid source HP. The conduit 55 terminates at $B_1$ when the slide-valve 30 in the rest position and therefore provides a small aperture. When the slide-valve moves in the direction denoted by the arrow $F_{10}$, the conduit 50 communicates through a large aperture, provided by the groove 60, with the point $B_1$ and, further on, with the groove BP which is directly connected to the tank B.

The points $H_1$ and $B_1$ are respectively connected by conduits 70 and 71, which are respectively controlled by one-way valves 72 and 73, to the distributor 10 (see FIGURES 5 and 27). This connection takes place through a constriction 74 disposed in the conduit 15 of the distributor 10.

The fluid coming from the point $B_1$ returns to the distributor 10 which directs it to the tank B through the conduit 16. Through the conduit 70, the liquid coming from the high pressure liquid source HP through the conduit 14 is conveyed to the point $H_2$.

Moreover, the position of the slide-valves 30 and 31 of the differentiating member 100 is controlled by the liquids acting on the piston 29 and on the piston 32.

The piston 29 is subjected, against the action of the recoil spring 35, to the action, on the one hand, of the pressure P (conduit 41) exerted on the central piston $33_b$ of circular section, and on the other, of the pressure $P'_1$ (conduit 43) exerted on outer piston $29_b$ of annular section.

In a symmetrical manner, the piston 32 is subjected, against the action of the recoil spring 36, to action of the pressure $P_1$ (conduit 40) exerted on the circular area of central piston $34_b$, and on the other hand, of the pressure $P'_2$ (conduit 42) exerted on the annular area outer piston $32_b$.

The working of this suspension system differs depending on whether the pressure difference $P'_2$, $P'_2$ in the mechanically deformable cavities of the suspension members $6'_1$, $6'_2$ are established slowly or suddenly.

For moderate pressure differences, the transverse differential corrector 100 acts in series with the distributor 10 in the following manner:

When the pressure $P'_1$ becomes greater than the pressure $P'_2$ the slide-valves 30 and 31 move together in the direction of the arrow $F_{11}$, which is in communication with $B_1$, (see FIGURE 5).

Simultaneously, the mechanically deformable space of the suspension member $C_1$ of the controlled wheel $1_1$ is put into communication with $H_2$ by the conduit $t_1$.

The effects of this communication set up with $H_2$ and $B_1$ are different according to the position of the slide-valve 11 of the distributor 10.

When the slide-valve 11 of the distributor 10 effects communication of the conduits 15, 70, 71 with the transverse differential corrector 100 and with the tank B through the conduit 16 (in the event that the mean deflection of the arms $3_1$ and $3_2$ in relation to the chassis is considerable), the liquid coming from the mechanically deformable space of the suspension member $6_2$ of the wheel $1_2$ is evacuated towards the tank B while passing through $B_1$, which reduces the pressure $P_2$.

If the slide-valve 11 of the distributor 10 effects communication of the conduit 15 with the transverse differential corrector 100 and with the high pressure liquid source HP through the conduit 14 (in the event that the mean deflection of the arms $3_1$ and $3_2$ in relation to the chassis is slight), the high pressure liquid source HP sends the liquid under pressure toward $H_2$ and then into the mechanically deformable space of the suspension member $6_1$ of the wheel $1_1$ and this increases pressure $P_1$.

The inverse process occurs in the two positions of the distributor 10 when $P'_2$ becomes greater than $P'_1$, the slide-valve 30 and 31 then moving in the reverse direction of the arrow $F_{11}$ and according to the direction of the arrow $F_{10}$ (FIGURE 5).

These decantations of liquid in both cases take place until the slide-valves 30 and 31 of the transverse differential corrector 100 have returned to a neutral position, i.e., when the forces acting in an opposing manner on the pistons 29 and 32 are equal. These forces are proportional, on the one hand, to $P'_1 + kP_2$ and, on the other hand, to $P'_2 + kP_1$.

In these formulas, $k$ denotes the ratio of the sections between the piston element $29_2$ or $32_2$ of circular section and the piston element 29 or 32 of annular section.

When the balance is established, the following relations exist $$P'_1 + kP_2 = P'_2 + kP_1$$
i.e., $$P'_1 - P'_2 = k(P_2 - P_1)$$

There is thus established, according to the invention, in the mechanically deformable spaces of the suspension members $6_1$ and $6_2$ a pressure difference $P_1 - P_2$ proportional to the pressure difference existing between the mechanically deformable spaces of the suspension members $6'_1$ and $6'_2$. Moreover, the absolute value of these pressures is controlled by the distributor as a function of the mean deflection of the arms $3_1$ and $3_2$ in relation to the chassis.

For sudden pressure differences, like those resulting from the vehicle's proceeding around a bend, the slide-valves 30 and 31 are totally displaced and the contributions or withdrawals of liquids occur by direct communication with the high pressure liquid source HP or the tank B, without going through the distributor 10, due to the adjustments of $HP_1$, $HP_2$ and $BP_1$, $BP_2$ caused by the considerable displacements of the slide-valves 30 and 31.

In this case, the relation is:

$$P_1 - P_2 = k(P'_1 - P'_2)$$

It is thus possible to produce a suspension that does not sag down on a curve, but retains the smooth-running qualities that ordinary anti-rolling devices tend to suppress.

The invention also relates to longitudinal responses in which the mean pressure of the pair of controlled wheels responds to a linear combination of the pressures of pairs of adjacent wheels.

It is known that longitudinal pitch forces relate in general to pairs of wheels or coaxial wheels.

In the case of controlled wheels, according to the foregoing, any longitudinal interaction will thus effect, in principle, the pair of controlled wheels and other pairs of wheels.

The longitudinal differential corrector according to the invention will define a mean pressure of the suspension members of the pair of controlled wheels, as a function of the mean pressures of the pairs of control wheels.

The distributor 10, which has been previously described, is thus replaced by a longitudinal differential corrector which, generally, if the pair of controlled wheels is placed in the central part of the chassis, can be subordinated to the mean pressure of two pairs of control wheels disposed on opposite side of the pair of controlled wheels.

Figure 6:
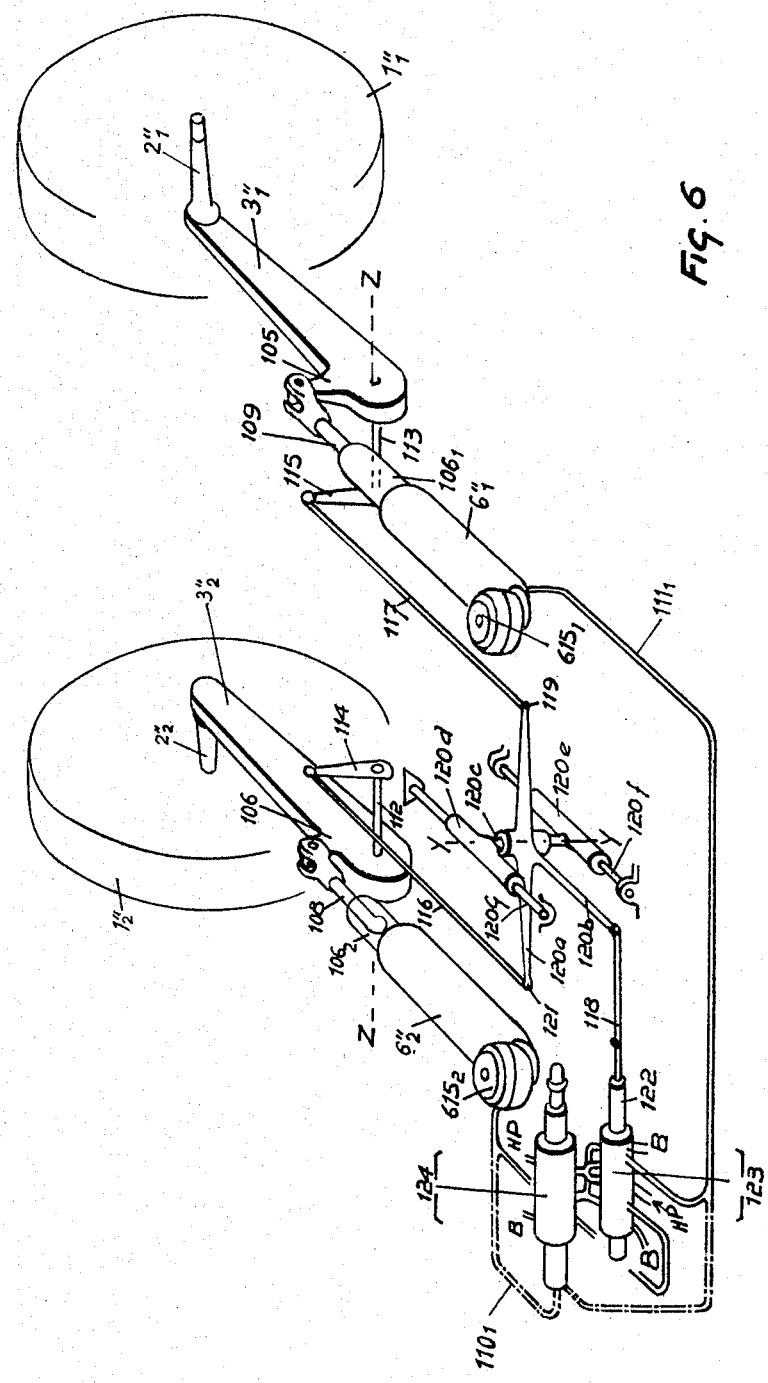
FIGURE 6 is a fragmentary view of a suspension system arranged symmetrically in relation to the longitudinal axis of a vehicle for the object of obtaining longitudinal response to a pair of control wheels.

The principle of such longitudinal differential correction on the controlled wheels $1''_1$ and $1''_2$ is shown in FIGURE 6. The system of FIGURE 6 includes a longitudinal differential corrector 124 for longitudinal control and a rolling corrector 123. These two units are also shown in FIGURE 7.

As shown in FIGURE 6, the pair of controlled wheels $1''_1$, $1''_2$ is mounted on the arms $3''_1$, $3''_1$, articulated to the chassis along the axis ZZ. Small connecting rods 108 and 109 are articulated on these arms $3''_1$, $3''_2$. These connecting rods bear by their ends, opposed respectively to said arms $3''_1$, $3''_2$, on pistons $106_1$ and $106_2$ of suspension members $6''_1$ and $6''_2$ rigidly attached to the chassis.

The arm $3''_1$ and $3''_2$ are rotatably integral with torsion bars 112 and 113 terminated by levers 114, 115 on which connecting rods 116 and 117 pivot. The connecting rod 116 drives one end 119 of a pendulum $120a$ about a rotation axis YY perpendicular to the plane of the chassis. This pendulum $120a$, by means of a lever $120b$, drives the rod 118 of the slide-valve of the rolling corrector 123; the other connecting rod 116 is pivoted at the other end of the pendulum $120a$. The rotation axis YY of the pendulum $120a$ is supported by bushing $120d$, $120e$ and can slide parallel to itself along the longitudinal axis of the chassis, the bushings $120d$, $120e$ sliding on fixed rods $120f$, $120g$, parallel to said axis.

Figure 7:
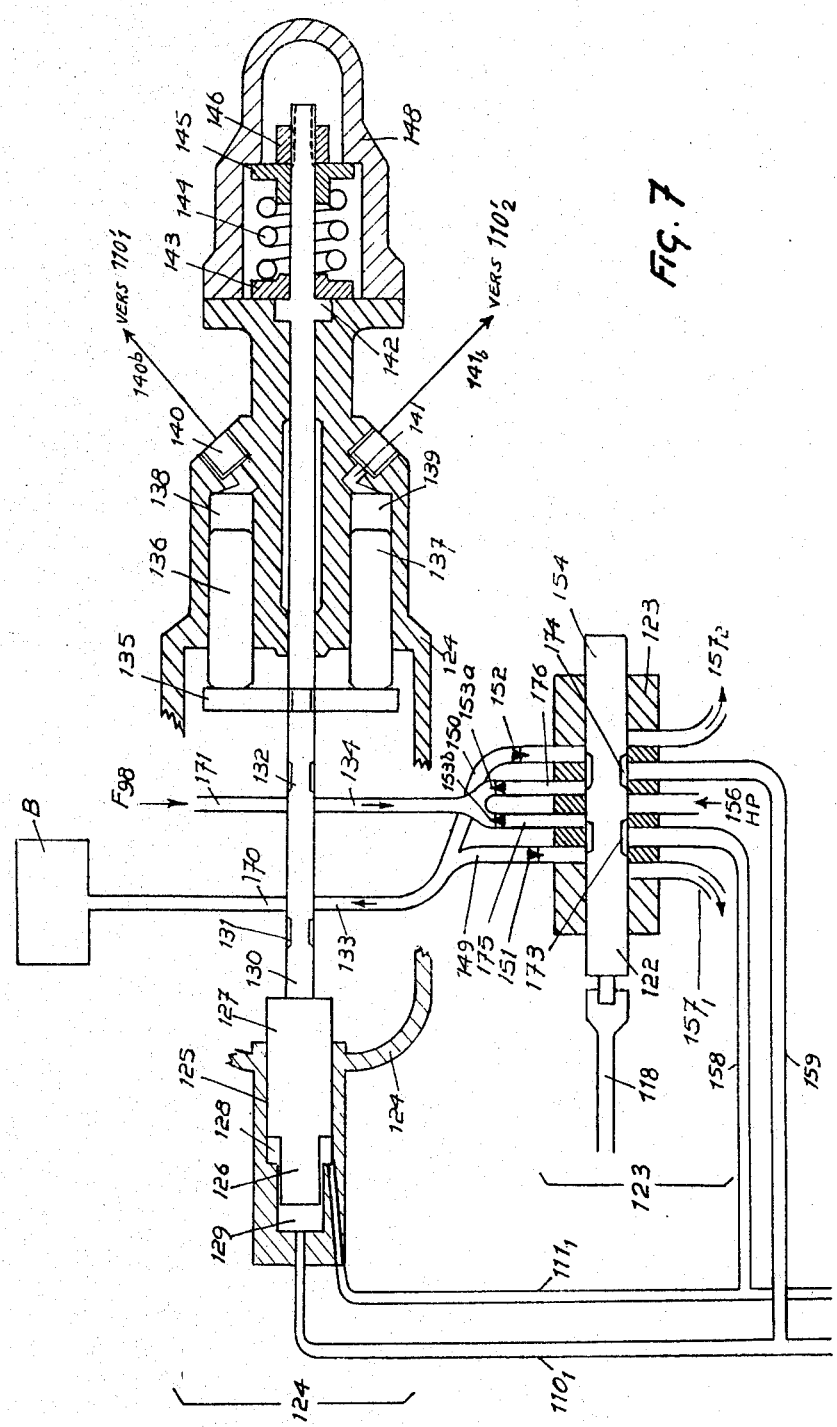
FIGURE 7 is an elevation-section of a longitudinal differential corrector for rolling used in the suspension system of FIGURE 6.

The unit designated the rolling corrector 123 and the unit designated the longitudinal differential corrector 124 are known in FIGURE 7. The longitudinal differential corrector 124 comprises a two-diameter cylinder 125, 126 defining with the piston 127, which itself has two diameters, two chambers varying in volume simultaneously in the same direction, according to the reciprocal movements of the piston in the cylinder; these chambers are the circular section chamber 129 and the annular chamber 128. The two chambers 129 and 128 are respectively connected by conduits $111_1$, $110_1$ to the spaces in the suspension members $6''_1$ and $6''_2$. Opposite to the piston 127 is a plate 135 integral with a shouldered spindle 142 movable in the body of the longitudinal differential corrector 124.

The plate 135 receives the action of pistons 136 and 137. There are two pistons per pair of control wheels respectively sliding in cylinders such as 138 and 139, connected by conduits 140, 141 to the suspension members of the control wheels on the opposite side of the plate 135. The shouldered spindle 142 is subjected to the action of a spring 144, which, by the play of supporting washers 143, 145, with the help of the shoulder-piece of the spindle 142 and the nut 146, comprises an elastic connection with an initial tension. This elastic connection returns the spindle 142 to its mean position in the absence of any differential hydraulic action.

The spring 144 is enclosed in the hood 148 integral with the body of the longitudinal differential corrector 124. The slide-valve 130 comprises two grooves 131, 132 enclosing, in its rest position, the lines 133, 134 and the conduits 170 and 171 which respectively face them and of which one, 170, terminates at the tank B and the other 171 communicates with the high pressure conduits conveying the high pressure which arrives in the direction of the arrow 98.

The conduits 133, placed facing the conduits 170 in connection with the tank B, open out into two branches 149, 150 including the check-valves 151 and 152 which are disposed in the body of the rolling corrector 123.

The conduits 134 are inserted between the branches 149 and 150 on the body 123 opening out into two branches 175, 176 which comprise the check-valves 153a and 153b. The slide-valve 154 of the rolling corrector 123 has symmetrically reduced diameters 173 and 174.

On the face opposite to the conduits 149, 150, 134 there are central high pressure input conduits which do not communicate with the reduced portions of the slide-valve, when the latter is in the rest position (symmetrical position). On either side of these conduits 156 there are conduits 158, 159 terminating in the suspension members $6''_1$ and $6''_2$ of the pair of controlled wheels. These conduits communicate through the reduced portions of the slide-valve in a rest position with the conduits 133, 134 that are partially open. Outside the conduits 158 and 159 there are conduits $157_1$ and $157_2$ in direct communication with the tank B.

Due to the overlapping of the two central reduced portions 173 and 174 of the slide-valve 154, and the conduits 149, 175 on the one hand, and 150 and 176 on the other hand, when the slide-valve 154 is in its mean position, there is a direct passage from the conduits 158 and 159 towards the conduits 134 and 135 without intercommunication between conduits 158 and 159, due to the check-valves.

The position of the slide-valve 130 of the longitudinal differential corrector 124, is a function of the difference of mean pressure between that prevailing in the suspension members $6_1$ and $6_2$ of the controlled wheels $1_1$ and $1_2$. According to the position of this slide valve 130, the conduits 158 and 159 leading to the suspension members $6_1$ and $6_2$ can transmit fluid to these members, or withdraw fluid from them in the required quantities according to the position of the slide-valve 154 of the rolling corrector 123, for re-establishing the longitudinal balance of the pressures developed in the corrector 124.

When the slide-valve 154 of the corrector 123 occupies an asymmetrical position, one of the lines 158 and 159, respectively, leading to the suspension members $6''_1$ and $6''_2$ of the controlled wheels, is in communication, through one of the reduced diameters 175 or 176 of the slide-valve 154, with the tank B, whereas the other conduits are in communication with the conduits 156 admitting the high pressure liquid coming from the source HP. On this account, the transverse balance or leveling of the vehicle is restored by the action of pressures in the suspension members $6_1''$ and $6_2''$ of each of the controlled wheels $1_1''$ and $1_2''$.

FIGURE 28 defines a suspension system for a vehicle having six wheels $1'_1$, $1'_2$, $1''_1$, $1''_2$, $1'''_1$ and $1'''_2$, placed symmetrically in relation to the longitudinal axis and utilizing the members described above in FIGURES 6 and 7. The length of the conduits utilized in this figure is the same as in FIGURE 27.

The pair of central wheels $1''_1$, $1''_2$ are control wheels, from the standpoint of rolling movements, with regard to the pairs of end wheels $1'_1$, $1'_2$ and $1'''_1$, $1'''_2$ so that the pressure differences prevailing in their respective suspension members $6'_1$, $6'_2$ and $6'''_1$, $6'''_2$, are a function of the pressure difference prevailing in the suspension members $6''_1$, $6''_2$ of the central wheels $1''_1$, $1''_2$. This function is developed by two transverse differential connectors 100' and 100''', acting as the transverse differential corrector 100 of FIGURES 1 and 27. Moreover, the pressure difference existing in the suspension members of the central wheels $1''_1$, $1''_2$ is controlled by the corrector 123 the purpose of which is to bring the chassis to a position parallel to the ground.

The two pairs of end wheels $1'_1$, $1'_2$ on the one hand, and $1'''_1$, $1'''_2$ on the other, are control wheels from the standpoint of vertical and pitching oscillations with regard to the central wheels $1''_1$, $1''_2$, i.e., the mean pressure or the sum of the pressures prevailing in the suspension members $6''_1$, $6''_2$ of the central wheels $1''_1$, $1''_2$ are proportional to the sum of the mean pressures of the suspension members $6'_1$, $6'_2$ and $6'''_1$, $6'''_2$ of the pairs of end wheels $1''_1$, $1''_2$, $1'''_1$, $1'''_2$. Thus, $$P''_1 + P''_2 = k(P'_1 + P'_2 + P'''_1 + P'''_2)$$

Hence, the mean pressure of the end wheels $1'_1$, $1'_2$ and $1'''_1$, $1'''_2$ is controlled by distributors 10' and 10''', which return the suspension to its longitudinal equilibrium position. These distributors 10' and 10''' correspond respectively to the pairs of end wheels $1'_1$, $1'_2$ and $1'''_1$, $1'''_2$. Moreover, the sum of pressures of the suspension members $6''_1$, $6''_2$ of the central wheels $1''_1$, $1''_2$ is responsive to the sums of the pressures of the suspension members of the end wheels by means of the corrector 124.

Thus, the suspension is returned towards its longitudinal equilibrium position by the distributors 10' and 10''', which act in opposition for pitching movements and parallel for vertical movements of the suspended vehicle relatively to the contact points of the wheel and ground. It is also returned to its transverse equilibrium position by the rolling corrector 123 associated with the central wheels. The mechanism of these controls takes place as follows:

(1) *Rolling control.*—The rolling control of the front wheels $1'_1$, $1'_2$ to the central wheels is assured by the corrector 100' in the same way as the controlled wheels $1_1$, $1_2$ in FIG. 1 are controlled by the corrector 100.

The rolling response of the rear wheels $1'''_1$, $1'''_2$ to the central wheels is assured by the corrector 100'' in like manner as in FIG. 1.

Moreover, the relative pressures prevailing in the suspension members of the central wheels $1''_1$, $1''_2$ are subordinated to the lateral slant of the chassis around an axis parallel to the longitudinal axis. In the corrector 123, the positions of the slide-valve depend only upon the relative angular movement or deflection of the arms $3''_1$ and $3''_2$.

To this end, pairing bars 112 and 113 carry at their ends opposite to the arms $3''_1$ and $3''_2$, levers $5_1$ and $5_2$ perpendicular to the figure plane which, by means of the side-pieces 116 and 117, respectively connect them to each of the ends of the pendulum 120a oscillating around the axis Y. This axis is carried by the mobile sliding support 120c along an axis parallel to the longitudinal axis. The central arm 120b of the pendulum 120a operates the slide-valve 122 of the corrector 123 by means of the side-piece 118. The corrector 123 tends, when its slide-valve 122 moves in one direction or the other from its equilibrium position, to admit liquid under pressure into one of the suspension members $6''_1$ or $6''_2$ and, conversely, tends to evacuate the liquid towards the tank coming from the other suspension members $6''_1$ or $6''_2$ which do not receive liquid under pressure, so as to bring together the wheels 1'' and 1'' in relative symmetrical positions for maintaining the transverse road-holding character of the vehicle parallel to the ground.

The differential in pressure between the suspension members $6''_1$ and $6''_2$ results from the oscillations due to gravity or centrifugal forces which pull the vehicle, and the pressure differential is reproduced in the controlled wheels $1'_1$, $1'_2$ and $1'''_1$, $1'''_2$ by means of the correctors $100'$ and $100'''$, as explained above.

(2) *Response to vertical and pitching movements.*—From the standpoint of pitching movements and vertical displacements from the center of gravity in relation to the contact point of the wheels and ground, each pair of wheels counters these movements and displacements only with the pressure sum of its suspension members.

The corrector 124 defines the sum of the pressures which must prevail in the suspension members $6''_1$ and $6''_2$. This sum is a function of the sum of the pressures of the members $6'_1$ and $6'_2$ and the pressures of the members $6'''_1$, $6'''_2$. These pressures are transmitted to the corrector 124 to act on the same side and sections of the pistons thereof (FIG. 7).

The system responsive to pitching and vertical movements operates in the following manner:

Under the hypothesis of a symmetrical load and a symmetrical chasis, the center of gravity with a normal load is aligned on the axis of the central wheels $1''_1$, $1''_2$.

Under these conditions, the sum of the pressures prevailing in the suspension members $6'_1$, $6'_2$, on the one hand, and the sum of the pressures prevailing in the suspension members $6'''_1$, $6'''_2$, on the other hand, are equal, when the vehicle is resting on level ground.

In this case, the mean pressure prevailing in the suspension members $6''_1$, $6''_2$ will be related to the pressure sum in the suspension members $6'_1$, $6'_2$ and $6'''_1$, $6'''_2$.

In a vertical movement of the center of gravity in relation to the contact point of the wheels and ground, the sum of the pressures respectively prevailing in the suspension members of the wheels $1'_1$ and $1'_2$ and of the wheels $1'''_1$ and $1'''_2$ will change in direct proportion to each other.

It follows that the sum of the pressures of the suspension members $6''_1$, $6''_2$ will vary directly proportionally to the pressure sum of the members of the wheels $1'_1$, $1'_2$ and $1'''_1$, $1'''_2$.

Actually, the slide-valve 130 of the corrector 124 is in balance between the thrust of the piston 125, the piston 125 being subjected to a force proportional to the sum of the pressures of the suspension members $6''_1$ and $6''_2$ transmitted through the conduits $110_1$ and $111_1$ on the one hand, and, on the other hand, the force applied to it by the pistons 136 and 137, this force being proportional to the sum of the pressures of the suspension members $6'_1$ and $6'_2$ transmitted through the conduits 140 and 141 plus a force proportional to the pressure sum of the suspension members $6'''_1$ and $6'''_2$, which latter force acts on the pistons 136b and 137b by means of the conduits 140b and 141b.

The balance conditions of the slide-valve 130, how it intervenes in a vertical movement will now be explained.

It is assumed that the center of gravity has a tendency to rise in relation to the vehicle. Due to symmetry, the flexibilities of the suspension members $1'_1$, $1'_2$ and $1'''_1$, $1'''_2$ are the same, and hence, the rate of the variations of the force due to the pistons 136 and 137 and the force due to the pistons 136b and 137b will be the same. Moreover, due to the equality of the flexibilities of the elastic masses of the suspension members of the wheels $1'_1$, $1'_2$ and the wheels $1'''_1$, $1'''_2$ if the distributors $10'$ and $10'''$ are identical, the intervention of said correctors will not introduce a pitching torque. It will thus suffice that the flexibility of the suspension members of the wheels $1''_1$, $1''_2$ is suitably proportioned to their load so that during small vertical movements of the suspended vehicle the distribution of loads in relative values between the various wheels is retained, whereas for greater movements of the suspended vehicle, which will cause the distributors $10'$ and $10'''$ to act, the action of the slide-valve 130 will maintain said distribution of loads.

Due to the action of the distributors $10'$ and $10'''$, which action tends to diminish the flexibility of the suspension members of the wheels $1'_1$, $1'_2$ and $1'''_1$, $1'''_2$ when they deviate from their balance position, the pressure in the chambers 129 and 128 diminishes slower than the pressure in the chambers 138, 139 and 138b, 139b. Therefore, the slide-valve 130 moves to the right.

Apertures 121 then put the conduits 133 into communication with the tank B and, through the corrector 123 which, at rest, leaves reduced passages through its slide-valve 122 with regard to the conduits communicating with the suspension members $6''_1$ and $6''_2$. The liquid introduced through conduits 133 will thus emerge from these suspension members to go to the tank B until the pressure in the chambers 129 and 128 shows a relative variation equivalent to that in the chambers 138 and 139, 138b and 139b, and vice versa.

The system thus tends to maintain the distribution of loads on the wheels, in spite of vertical oscillatory movements of the suspended vehicle.

In the case of a pitching movement of the suspended mass in relation to the vehicle, if the loads on the front and rear of the vehicle are symmetrical, pitching sets up inverse variations in the pressures in the suspension members of the wheels $1'_1$, $1'_2$ and $1'''_1$, $1'''_2$. Since the sections of the pistons 136, 137 and 136b, 137b are identical due to symmetry, these inverse variations do not change the resultants of the forces which impel said pistons.

It follows that these forces do not vary, the slide-valve does not move as the pitching movement occurs without displacement of the central wheels in relation to the plane of the chassis, and in these conditions, the load taken by the central wheels is not altered.

Finally, the response to pitching and to the vertical movements effected by the corrector 124 modifies the pressure in the suspension members $6''_1$, $6''_2$ so that the sum of the pressures prevailing in the suspension members $6''_1$, $6''_2$ remains a function of the sum of the mean pressures prevailing in the suspension members of the wheels $1''_1$ and $1''_2$, on the one hand, and the rear wheels $1'''_1$ and $1'''_2$, on the other. In the event of pitching, the increased pressure of the wheels $1'_1$ and $1'_2$ is compensated by the pressure reduction in the suspension members of the wheels $1'''_1$ and $1'''_2$ and vice versa so that the sum of the mean pressures remains constant. This means that the sum of the pressures in the suspension members $6''_1$, $6''_2$ does not vary.

The foregoing embodiment may be modified in accordance with FIG. 28.

Figure 8:
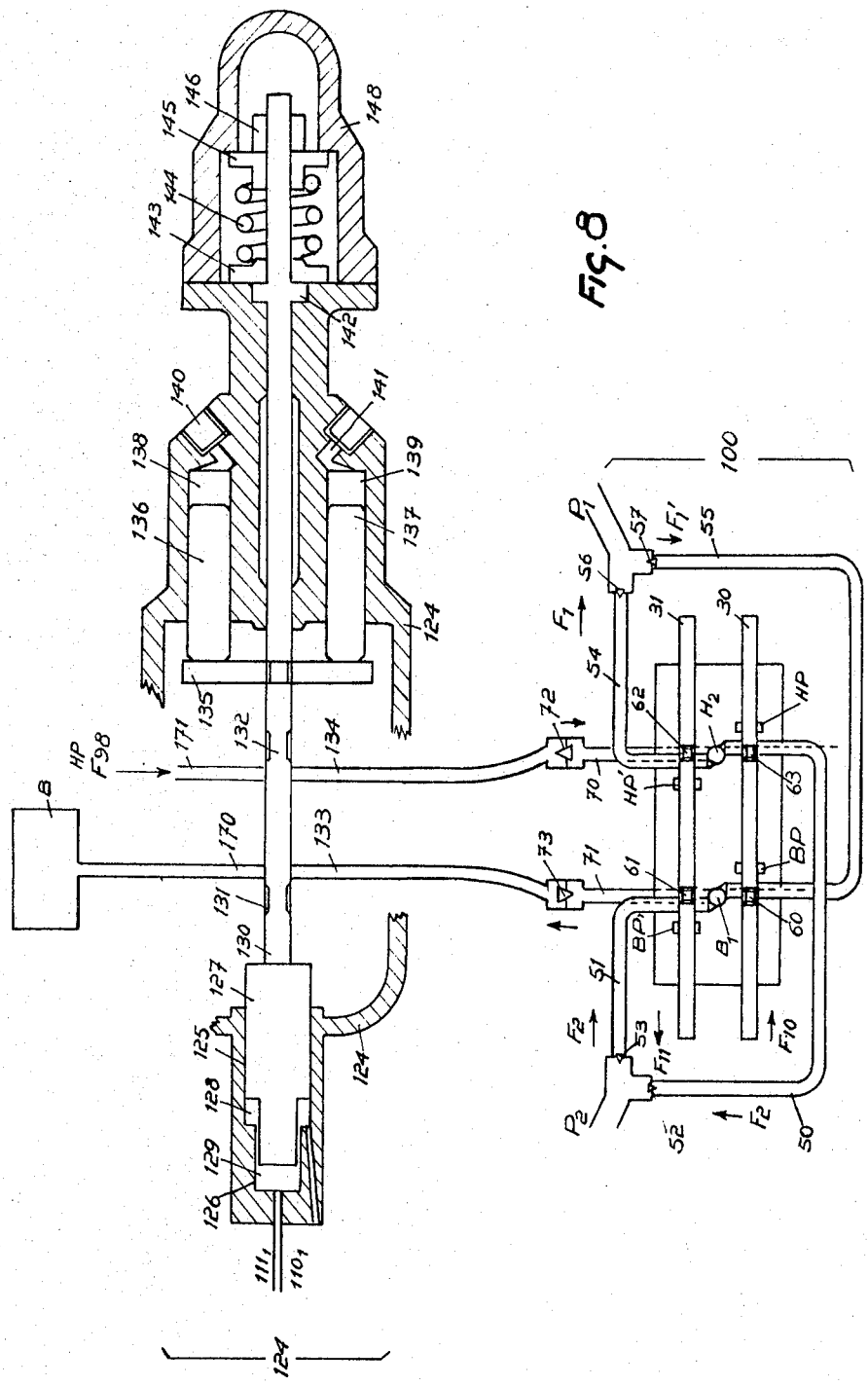
FIGURE 8 is a fragmentary sectional view of a suspension system simultaneously effecting longitudinal and transverse response.

For example, as shown by FIG. 8, the corrector 123 of FIG. 6, may be replaced by the corrector 100 shown in FIGS. 4 and 5.

The conduit 71, connected to point B of the corrector 100, is connected to the conduits 133 going towards the corrector 124. The conduits 70 connected to point $H_2$ of the corrector 100 are connected to the conduits of the corrector 124. Thus, through the conduits 71 and 133, the fluid coming from point $B_1$ returns to the corrector 124 which directs it to the tank B.

The fluid coming from the source HP through the conduits 171 returns to point $H_2$ through the conduits 134 and 70. If there are more than two control wheels, the pistons placed at the ends of the corrector 100 comprise more than two stages as shown with reference to FIG. 9 wherein a corrector 1000 is provided.

The corrector 1000 has a triple-staged piston. Two slide-valves 30 and 31 effect the distribution of the fluid under pressure or the evacuation of fluid coming from one or both mechanically deformable spaces of the suspension members of the two symmetrically arranged controlled wheels.

The slide-valves 30 and 31 are driven by two pistons 29 and 32 placed on either side of the slide-valves 30 and 31.

Each piston 29 and 32 comprises two-staged pistons 33B and 33D, or 34B and 34D defining three cavities 33, 33C, 33E or 34, 34C, 34E, the volume of the cavities varying simultaneously. These pistons, being thus constructed, are each subjected to the action of a recoil spring 35 and 36 operating against the action of differential forces resulting from the pressures prevailing in the mechanically deformable members of the suspension members, as will be described hereafter. The springs 35 and 36 also return the slide-valve 30 and 31 to their mean position in the absence of any differential hydraulic action. For effecting a proper return to the mean position, the bearing cups $29_1$ and $32_1$ are loosely mounted on the springs 29 and 32 and transmit their action to these pistons by means of shoulder-pieces $29_2$ and $32_2$ carried by the pistons.

In the rest position of these pistons 29 and 32, the external edges of the cups $29_1$ and $32_1$ are in contact with fixed bearing rings $29_3$ and $32_3$.

Under these conditions, as soon as the pistons 32 and 29 move, they are impelled only by the spring that their movement tends to compress, the initial tension of which spring can be chosen independently of its flexibility beyond its compression load.

The cavities 33, 33C, 33E and 34, 34C, 34E through conduits communicate with the mechanically deformable spaces of the suspension members of the wheels in the following manner:

The piston 29 is subjected, against the action of a recoil spring 36 to the action, on the one hand, of the pressure $P_1$ of a controlled wheel which is applied on the annular section 29, and on the other hand, to the action of the pressures $P'_1$ and $P''_2$ of two control wheels which are applied respectively on the annular section of 33B and the circular section of 33D.

In a symmetrical manner, the piston 32 is subjected, against the action of the recoil spring 35, on the one hand to the action of the pressure $P_2$ of a controlled wheel which is applied on the annular section 34, and, on the other hand, to the action of the pressures $P'_1$ and $P''_2$ of the control wheels which are applied respectively on the annular section of 34B and the circular section of 34D.

Although on account of the transverse symmetry of vehicles, the cooperation by symmetrical pairs in relation to the longitudinal axis of the vehicle seems preferable, it can be advantageous from certain points of view and in certain cases to place the control wheels on one side of the vehicle and the controlled wheels on the other. In this case, for example, the control wheels might be placed on the right side, for countries where vehicles keep to the right, and, in particular in the case of a four-wheeled vehicle, a distributor provided tending to maintain the mean pressure of each of these wheels. For reducing power consumption, the distributors are time-controlled so as to eliminate corrections coupled with transient wheel oscillations.

Under these conditions, the two controlled wheels, situated on the left in the particular case considered here, will be controlled by a distributor on which can be superimposed the action of a transverse acceleration detector which will subsequently be described.

FIGURE 10 is an example of a control of this kind. In FIGURE 10, the two control wheels are placed on the same side of the vehicle and two controlled wheels on the other side and symmetrical to the control wheels.

In the example considered here, the control wheels are placed on the left and denoted by the reference characters $1_2$, $1'_2$ whereas the controlled wheels are placed on the right of the longitudinal axis of the vehicle and bear the reference characters $1_1$, $1'_1$.

The pressure in the suspension members of the control wheels is controlled by two pistons $10_2$, $10'_2$ connected to the arms $3_2$, $3'_2$ by low inertia torsion bars $4_2$, $4'_2$.

Levers $4'_{1a}$ and $4'_{2a}$ are provided at the inner end of low inertia torsion bars $4'_1$, $4_1$, the latter being integral in rotation with the arms $3'_1$, $3_1$, and are connected by small connecting rods $4'_{1b}$, $4_{1b}$ to a pendulum with a spindle perpendicular to the plane of the chassis, the spindle being keyed on to a low inertia torsion bar $4_{1d}$ which drives the rod of distributor $10_{11}$ by means of a lever $4_{1e}$.

The working of this combination of members is at all points similar to that which has been described in the case of FIGURES 3, 4 and 5.

It is clear that within the scope of the invention, it is possible in arrangements of control wheels and controlled wheels on either side of the longitudinal axis of the vehicle, to reproduce the other types of control already described in this disclosure or the various possible combinations of their elements, so as to obtain the required results.

According to another characteristic of the invention, to which reference has been made above, it is also possible to control the suspension of the vehicle with regard to effects due to accelerations, in particular, during turning because of curves in a road.

To this end, the distributors of the control wheels $1'_1$ and $1'_2$ are subject to an acceleration detector and respond thereto. This response can be limited and, for example, can effect the correction of the control wheel situated on the side of the center of the curve, below its normal equilibrium figure, whereas the control wheel on the exterior of the curve will remain subject to its distributor and suspension member without intervention foreign to its normal functioning (or vice versa).

Such a solution effects a comprise as to comfort and holding of the road, and in case of failure of the acceleration detector, does not deprive the driver of the help of the corrector of the controlled wheels, which adds to safety.

Partial control can be effected by means of a piston coaxial with the slide-valve of the distributor which is placed on the side opposite to its drive (FIGURE 11). This piston superimposes its action on that of the elastic medium introduced into the chamber 212 of the distributor shown in FIGURE 3.

Fluid under pressure is directed at the required moment into the chamber of this piston by one of the slide-valves of the acceleration detector, with, in diversion, or communication with, an elastic capacity formed, for example, by a small spring or oleo-pneumatic accumulator.

An equivalent elasticity could be more simply introduced in the shape of a spring disposed between the piston in question and the slide-valve of the distributor.

The action of the distributor piston is proportionate to the acceleration to be corrected by means of the members of the acceleration detector opposing this acceleration, and as a function of the slope of the vehicle towards the center of the curve.

An acceleration detector can advantageously use in such suspension systems, and a fluid-operated detector formed by two symmetrical jacks each comprising respectively a piston having a bearing point on a mobile element of each suspension member and comprising a chamber variable with the displacements of the suspension members, in communication with a mechanical elastic medium (small spring accumulator) or hydro-pneumatic medium. Each of these chambers is connected to a piston opposing the displacements of the acceleration detector member for which the responsive piston concerned is in action.

To prevent any leaks and possibilities of the acceleration detector getting out of order, an advantageous substitution can be made for the pistons referred to above, of deformable members without sliding fluid-tightness, for example, metal bellows with corrugated walls or reinforced diaphragms making certain displacements and variations of concomitant volumes possible without permanent deformations under limited pressures.

A suspension system for vehicles comprising the combination of distributors for control wheels $1'_1$ and $1'_2$ and an acceleration detector member of the above-mentioned type, is shown in FIGURES 11 to 20.

The distributor (FIGURE 11) of each control wheel $1'_2$, $1'_2$ is similar to that of FIGURE 3 (distriutor of controlled wheels $1_1$ and $1_2$), i.e., it comprises, as in FIGURE 3, the slide-valve with its reduced part 17, the conduit outlets 16, 16B connected to the tank B, the outlet of the conduit 14 directing flow toward the source HP and the conduit 15, connected to the suspension member of the control wheel concerned. The diaphragm 19 separates the annular chamber 211, connected to the tank from the external chamber 212 in which the fluid under pressure defining the distributor chosen is introduced by the conduit inserted at $16_1$.

Each distributor also comprises a controlling piston 250 of the acceleration detector 351. This piston 250 comprises a fluid-tight packing 251 and, through a conduit 252, communicates with the acceleration detector 351.

It is seen that the action of the piston 250 is added to that of the fluid admitted into the chamber 212 to tend to drive the slide-valve 11 towards the exterior in a manner opposed to the elastic rigging connected to the distributor of the pilot wheel.

The action of the fluid thrusting the piston 250 thus tends to put the conduit 15 into communication with the tank, by means of the reduced portion 17.

A fluid-operated jack 350 (FIGURE 12) essentially comprises a body 253 and two half-shells 254, 255, screwed on either side of this body. These half-shells hold two diaphragms 256, 257 to the body 253. The diaphragm 257 isolates compressed gas acting as an elastic mass housed in a chamber 258. A lower chamber 259 contains a liquid under pressure and communicates with the acceleration detector through the conduit connected at 266 to the body 253.

The lower diaphragm 256 presses on the end 261 of a rod sliding in the part 254, which has its opposite end 262 in a recess provided on the arm or lever 263, pivoted on the chassis at 264 and integral in the angular movements of the displacements of the control wheel $1'$ considered. A spring 265 applies the rod 261 against the lever 263 of the spindle 264 of the control wheel $1'$, when the chamber 59 is filled with liquid, the wheels being in the low position. In the example of embodiment illustrated, the body 253 is connected to the chassis of the vehicle by the bearing part 267 with the interposition of a plastic layer 268, permitting slight angular movements of the body 243 resulting from the oscillations of 263 around the spindle 264.

For each position of the lever 263, there is a corresponding pressure developed due to the deformation upwards of the two diaphragms 256, 257, shown in FIGURE 12. FIGURE 12 illustrates a condition where the corresponding wheel is completely retracted with regard to its position. This pressure developed is communicated by the pipe line 266 to the acceleration detector shown in FIGURE 13.

The acceleration detector 351 (FIGURE 13) is formed by a detecting mass 274 responsive to the action of centrifugal force and placed in the double-covered—270 and 271—body 269. The detecting mass 274 is suspended by metal strips 275, 276 attached to the cover 270.

The side bodies 277, 278 contain members transmitting, in opposition to each other, to the detecting mass 274, the action of the pressures of the fluid-operated jacks respectively connected to the pipe lines $266_1$, $266_2$.

The body 278 being sectioned, we see that it defines the chamber 279 in which the bellows 280 are situated, internally guided by the part 281 whose end has a passage 282 in which a pin or needle 283 is engaged, the pin 283 transmitting to the detecting mass 274 the action of the pressure of the chamber 279 on the bellows 280. The end of the pin 283, on the detecting mass side 274, is inserted in a recess 284 provided in the sensing mass 274. We find again in the lateral body 277, symmetrical arrangements similar to those of the sensing body 278. The mass 274 is returned to its symmetrical neutral position by pawls 286, 287, pivoted on the cover by the spindles 288, 289, which receives the action of springs applying them to the centrally disposed roller 285 carried by the mass 274. Adjustable stops 290, 291 limit the action of the pawls to the displacements of the mass 274 in a single direction (for which the pawl is thrust by the roller 285), so that the connection thus effected is of the initial threshold tension type.

Finally, two symmetrical slide-valves 292, 293 are driven by the rollers 294, 295 carried by the mass 274. The bodies of the slide-valves 292, 293 seen at 296, 297 are integral with the cover 271, their respective conduits terminating at the part 298, at the terminals of the conduit 299, 300 going to the tank B and 301 going to the source HP, coming from the hydraulic unit. The reduced portions 302, 303 are connected to the terminals of the conduits $U_1$, $U_2$ seen at 304, 305.

The central grooves of the slide-valves 306, 307 coincide respectively with the grooves 303, 302, alone, in the rest position. When the detecting or sensing mass moves to the right, the groove 306 intersects the orifice on the slide-valve of the left branch of the conduit 301, and liquid under pressure is directed to the conduit connections 304.

Simultaneously, the groove 307 intersects the orifice on the slide-valve of the connection 300, connecting the conduit 305 to the tank.

For a displacement of the mass 274 to the left, it is the conduit $U_2$305 which would be put into communication with the source HP, and the conduit U 304 with the tank.

The general arrangement of the above-mentioned devices on one of the control wheels $1'$ of the vehicle is shown in FIGURE 14.

The control wheel $1'$ is linked up to the transverse arms 309 and 310 respectively pivoted on the chassis at 311 and 312.

The control wheel $1'$ is associated with a suspension member $6'$, similar to that of FIGURE 2, whose body 313 is attached to the chassis. The piston 314 sliding in the body 313 comprises a rod 315 forming a small connecting rod connection to the lever 316 integral with the transverse arm 310.

This suspension device also comprises the elastic means 317 of the hydro-pneumatic type, for example.

Moreover, the assembly comprises the fluid-operated jack 350 the centrifugal acceleration detector 351 and the distributor 318 connected with the body 313 of the suspension member $6'$ by the conduit 15.

An elastic connection 320 drives the slide-valve 11 of the distributor 318. The fluid-operated jack 350 and the acceleration detector 351 are connected by the conduit $266_1$ which connects the fluid-operated jack 350 to the body 277 of the acceleration detector 351 as shown in FIGURE 11.

Finally, the chamber of the control piston of the corrector 318 (as shown in FIGURE 11) is connected by the conduit 252 to the conduit $U_1$304 of the acceleration detector 351 (see FIGURE 13).

The small elastic means 323, of the hydropneumatic type, for example, is mounted branched on the conduit 252.

Supposing that the vehicle is taking a curve and the detecting mass 274 of the acceleration detector 351 moves to the right (on FIGURE 13), the conduit $U_1$304, 252 conveys the liquid under pressure into the chamber of the piston 250 of the distributor 318 (FIGURE 11) at a pressure that will depend on the load of the elastic means 323, eventually controlled by an adjustable throttle.

The connective pressure valve of the wheel $1'$ increases with the pressure prevailing in the chamber of the piston 250.

The last mentioned pressure is limited by the pressure prevailing in the conduit $266_1$ which tends to bring the detecting mass 274 towards its rest position, and this pressure increases with the movement of the wheel 1', according to the charactertistics of the corrector 350.

What has just been described for the wheel 1' situated on the side of the center of the curve in the case of the displacement of the mass 274 towards the right, would be identically reproduced in the case of the symmetrical wheel 1' for a curve in the opposite direction.

The slope of the vehicle to the interior of the curve is thus limited for a given acceleration by the choice of the parameters associated the dimensions and characteristics of the various elements that have just been described.

It is possible to regulate the duration of the return to the straight position on coming out of a curve by throttling or using a calibrated check-valve on the return towards the tank of the pipe line 299, 300 of FIGURE 13.

Numerous modifications can be applied to the abovementioned member without going outside of the scope of the invention for that purpose, more particularly with regard to corrector 350 and the acceleration detector 351.

Figure 15:
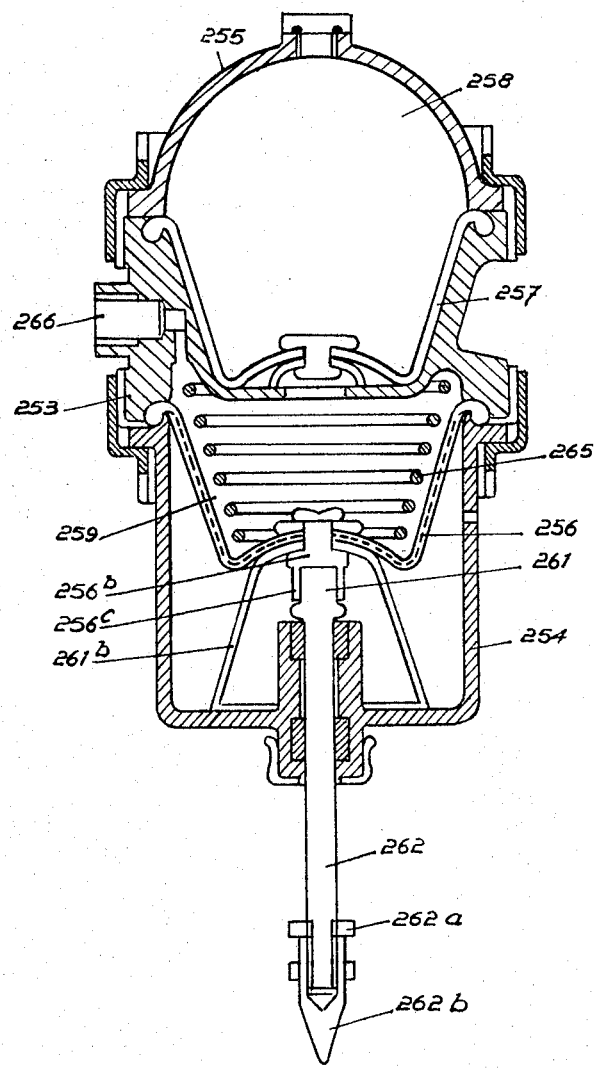
FIGURE 15 is an elevation section of another embodiment of a shock absorber similar to that of FIGURE 12.

For example, FIGURE 15 is a large-scale section of an alternative embodiment of a detector or sensor comprising some detailed improvements not shown on the apparatus, the object of FIGURE 10, and which are more particularly the following:

The end 262 of the control rod of the corrector comprises a point 262B extended by a threading and locked at a suitable height by the lock-nut 262a.

Furthermore, for putting higher pressures into operation in the chambers 259 and 258, the rod 261 is integral with an inverted convex shape 261b on which the diaphragm 256 partially bears when the rod 261 thrusts itself into the shell 254, owing to the movements of the wheel-holder member with which it is integral. The shape 261b, in the case of FIGURE 13, is assembled on the diaphragm 256 by the rivet 256b, terminated underneath by a cylindrical cavity 256c, into which rod 261 is inserted.

On the other hand, for resisting pressure effects in the non-maintained parts, the diaphragm 256 comprises a flexible stiffener, either incorporated like a web, or placed inside said diaphragm 256 on its face opposite to the cavity 259.

FIGURE 16 is an alternative embodiment of the acceleration detector shown in FIGURE 13.

The body of the detector 269 comprises an upper cover 270 and a lower cover 271.

The detecting mass 274 is suspended from the body 269 by elastic strips 275, 276, which, in the rest position are rectilinear and form an acute angle between themselves.

This arrangement, for slight displacements of the detecting mass 274 on either side of its rest position (symmetrical in relation to the body), is the equivalent of a pendular suspension on an axis approximately placed according to the intersection lines of the planes of the two leaves 275, 276.

The side bodies 277, 278 have sloping and approximately perpendicular axes to the leaves 275, 276. The form of the bellows members housed in the side bodies is similar to that described in the case of FIGURE 11. The return of the mass 274 to its symmetrical rest position is effected by the pawls 287, 286, pivoted on the body 269, along the axes 289, 288, receiving the action of springs applying them to the central roller 285 carried by the mass 274.

Adjustable stops 290, 291 limit the action of the pawls to the displacements of the mass 274 in one direction only, so that the link thus formed is an initial threshold tension one.

Finally, the two slide-valves 292, 293 symmetrically driven by the rollers 294, 295 integral with the mass 274, are joined together, due to the relative slope of their spindles, by the equalizing bar 500, pivoted at 601 on a part terminated at the top by a hood and sliding for adjustable play (without turning on itself) in a cylindrical housing 503 provided in the lower cover 271. The axis of the housing is in the plane of symmetry of the device or in the vicinity of that plane. The housing 503 comprises a slot 504 and a secant locking bolt 505 passing into a notch 506 arranged in the bottom of the part 502 parallel to the plane of FIGURE 14. By arranging the part 502 at a reasonable height in the cover 271, the play of the slide-valves on the rollers 294, 295 can be eliminated.

A double device intended to eliminate automatically or reduce transient responses of differentiating members, when the acceleration detector is in action, is placed on either side of this member under the side bodies 277, 278. Each of the devices in question comprises a slide valve 508a or 507a, returned against the mass 274, by a spring 507e or 508e. The central groove of the slide-valve 508a or 507a faces a secant channel seen in section at 507b or 508b. When the mass 274 deviates from its rest position (symmetrical position) the channel 508a or 507a is put into communication by the groove of the slide-valve with one or other of the secant channels 507c or 507d, or 508c or 508d. The channels 507c and 507d communicate with each other like 508c and 508d, and in combination with the channels 508a or 507a, they short-circuit all or part of the throttles placed in the conduits delivering fluid from the source HP and the conduits returning fluid to the tank B from the distributors and correctors.

Apart from this, the arrangement of FIGURE 16 has an especial advantage, with its compactness, to enable a reduction in the deformation of the bellows placed in the side bodies 277, 278 for one and the same value of the strokes made at the slide-valves 292, 293.

Instead of a partial transverse acceleration control, like that described in FIGURE 14, a member 318 of FIGURE 11 may be substituted, that which is shown in FIGURE 17 effecting a complete control.

The distributor shown in FIGURE 17 is, in its right-hand part identical with the distributor shown in FIGURE 3. The slide-valve of this corrector is integral with the piston rod 401 integral by its opposite end with the slide-valve 11 of the piston 400.

The piston 400 defines in the cylinder 403, bored into right-hand body of the member 410, two inversely deformable cavities 405 and 406 which, by the points of the pipe line 407 and 408 can be connected to the pipe line $U_1$ $U_2$ of the acceleration detector.

The invention provides another method of controlling or subjecting a suspension member to an acceleration detector not requiring a shock absorber to be brought into operation. According to this form of embodiment there is superimposed on the elastic drive (linked up with the displacements of the wheel considered) of the fluid-operated jack devoted to a control wheel, a distinct elastic action of the former and controlled by a double-acting hydraulic piston forming the member 600 shown in FIGURE 18.

This member, 600, called the coupling member to the corrector for adding a correction to it, is formed in the following manner: each of the faces of the piston 602, by the points of the conduits 607W and 608Z, can be put into communication with one or other of the conduits of an acceleration detector.

The point 606 is connected to the tank for the return of leakages. The piston rod 603 emerging outside the body 601 comprises a hood or pivot 609 by which it drives a connecting rod 610 linking up the elastic device superimposed on the elastic drive of the fluid-operate jack considered.

Figure 19:
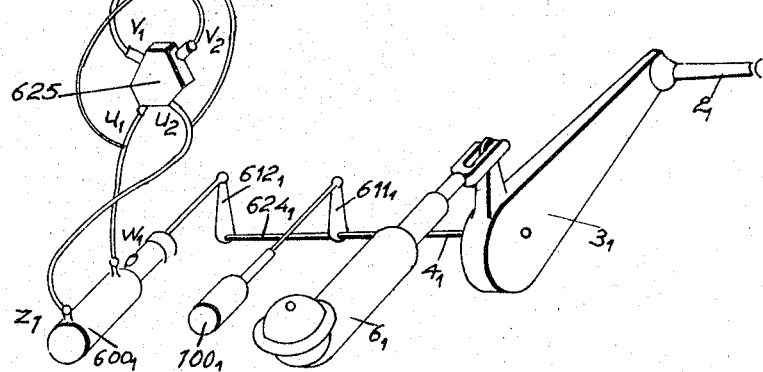
FIGURE 19 is a fragmentary perspective view of a suspension system of a pair of control wheels comprising the combination of a transverse acceleration detector, an individual distributor and a coupling member of the distributor, for adding thereto the transverse acceleration correction.

FIGURE 19 gives a concrete example of such combination.

In this FIGURE 19, the acceleration detector 625 is placed in the transverse plane of the chassis, and hence, plays the part of a transverse or sloping transverse acceleration detector.

Conduits $U_1$ and $U_2$ are respectively connected to the points $W_1$ (607) and $Z_1$ (608) of the member 600, as well as the pipe lines $V_2$, $V_1$ of the side bodies of the acceleration detector. The bellows placed in these side bodies, in the case of the present fitting, are of smaller section in the case where detectors or sensors are used, owing to the intervention of the (higher) pressure used in the member 600. Also, in these conditions, needle pistons can be substituted for them, working with or without fluid-tight packing.

The device works in the following manner:

We suppose that the mobile mass of the detector 625 is deviated to the left in the case of the figure, the conduit $U_2$ is supplied with liquid under pressure by the distributor of the member 625, whereas the conduit $U_1$ is in communication with the tank. The piston of the member 600 extends out of the cylinder and by the lever 612, twists the bar 624, and, modifying the balance position of the lever 611, tends to draw the slide-valve of the corrector 100, which causes the evacuation of the liquid under pressure of the suspension member $6_1$ and thus tends to oppose the exit of the corresponding wheel $1_1$.

It is actually noticed that when the mobile mass of the detector 625 is deviated to the left, the suspended mass, and hence the chassis of the vehicle, also tend to slope towards the left. In the reverse case, the correction would be equally opposed to disturbing action.

The phenomenon is quantitatively limited, for in a balancing system, to a given torsion torque value imposed in the bar 624, there corresponds a given pressure in the cylinder of the coupling member 600, and a given value of the force impelling the mobile mass of the transverse acceleration detector which is returned to its rest position by the action of the bellows on the piston supplied by the pipe line $V_1$. The torque imposed on the bar $624_1$ produces a change of position of the wheel-holder arm $3_1$ which rises. The wheel is driven into its housing to such an extent that the new torsion of the bar $624_1$ balances the action of the bar $624_1$ at the level of the lever 611, brought back to its neutral position at the moment of balance. With a careful selection of bars and sections of pistons and bellows, the required type of counter-centrifugal correction can be obtained.

FIGURE 20 shows a section of a longitudinal differentiating member, which derives, from the standpoint of its structure, from the corrector 124 shown in FIGURE 7. The corrector 124 acts for defining the mean pressure in the wheel-holding members of a pair of wheels longitudinally responsive to at least two pairs of control wheels.

The longitudinal differentiating member 700 shown in FIGURE 20 fulfills a purpose of the same kind, by establishing a linear relation between the pressures prevailing in the suspension members of a pair of control wheels and the pressures in the suspension members of at least two other pairs of controlled wheels, with, moreover, the superimposition of opposing corrector pistons enabling the linear relation in question to be modified by lightening or overloading the pressures acting on one side of the slide-valves 130a of the member 700. This arrangement has, in particular, an essential interest, in the case of a vehicle with at least six wheels, the longitudinal leveling of the vehicle being effected by the pairs of end wheels, the pair of pairs of central wheels bearing a percentage of the total load which depends on the load or fuel consumption and related factors.

In a case of this kind, as will subsequently be described, the mean pressure of the suspension members of the pair of front wheels can be subordinated to a mean distributor, the mean pressure of the suspension members of the pair of rear wheels suspension members of the pair of rear wheels being defined by means of a longitudinal differentiating member 700, by the condition that the percentage of the total load borne by the central wheels, is a given linear function of the percentages of the total load borne by the front and rear wheels.

It will be seen that in these conditions, according to the load and its distribution, that it could be advisable, from the standpoint of the fatigue of the parts, grip or hold of the road of the whole, that a ratio of this kind should be adjustable by the action of a correcting pressure.

Where $C_m$ designates the central load, $C_{AV}$ and $C_{AR}$ the front and end loads, and P the total load, without correction pressure, the following relation holds $$C_m = C_{AV} + C_{AR}$$

and with a correction pressure Pc, the following relation holds $$C_m = Pc + C_{AV} + C_{AR}$$

In order that this latter relation not be influenced by the dynamic variations of all or part of the pressures of the wheel-holder members, intervening in the working of the longitudinal differentiating member 700, it is permissible to interpose throttles on the hydraulic connections effecting the transfer to the differentiating member 700 of said pressures, followed by hydro-mechanical or hydro-pneumatic elastic cavities (when said connections are followed, starting from the suspension members towards the differentiating member 700).

Such elastic cavities act as reference cavities used, for example, in improving damping devices and which are required to effect or develop a mean balancing pressure.

The body of the differentiating member 700 is made up of five parts 124a, 124b, 124c, 124d and 124e. The first part comprises a triple-bore concentric cylinder defining, with the axial piston $129_4$ and the concentric staged piston $127_1$, three chambers $129_1$, $129_2$, 128. The piston $120_4$ is able to move in connection with the staged piston 127, by sliding in the bore $127_4$ optionally comprising the fluid-tight packing $127_5$.

By penetrating into the piston 127, this piston $129_4$ compresses a spring 655 placed between the mobile cup 654 and a blind flange $127_2$ secured in the stages piston by a stop rod $127_3$.

The second member of the body of the corrector 700 is designated $124_b$; it comprises two parallel radial channels respectively terminated by conduit points 170, 133 and 171, 134.

As in the case of the corrector 124, the conduits at 170 and 171 are connected to the tank B and the source HP, whereas the conduits 133 and 134 are connected to a corrector 100. Along the axis of the part 124b, and intersecting the two parallel radial channels, there is a slide-valve 130a, with two grooves 131, 132, enclosing, in a rest position, the radial channels in their area intersected by these slide-valves. The arrangement of the conduits 170, 171 of FIGURE 20 is the inverse of that of FIGURE 8 in that the suspension members of the controlled wheels are connected opposite to the plate 135 in the case of FIGURE 20 and not on the left as in FIGURE 8.

The third body of the corrector 700 designated 124c contains the pistons (arranged in a drum) parallel to the axis of the slide-valve 130a, and the plate 135, whose cylindrical edge is guided by the cylindrical cavity 659 provided in the part 124b. This plate is integral with a spindle 130b comprising the shoulder 142 defining with it the position of an initial tension connection by a spring 144 and cups 143, 145, externally positioned by a shoulder of the part 124c and a centerage borne by the fourth part of the corrector 700, designated 124d.

This latter part of the body of the corrector 700 acts as a housing for the spring 657 homologue of the spring 655 and guiding the spindle 130b. The fifth part of the body of the member 700, designated 124e, forms the cylinder of the piston $129_5$ analogous to the piston $129_4$ with its packing 124f and connection to the corresponding conduit.

The end of the piston $129_5$ towards the center of the corrector 700 carries the bearing washer 658 of the spring 657, whereas the opposite washer 656 is carried by the spindle 130b. The chambers $129_1$, $129_3$ receive, through the adjacent holes, the fluids transmitting the correction pressures $Po_1$ or $Po_2$.

The working of the corrector 700 is similar to that of the corrector 124, with the addition of the superimposition of the action in opposite directions of fluids brought through the holes marked $Po_1$ $Po_2$ which receive in FIGURE 20, the arrangement to be modified of the link of the initial pressure recoil, in the case of the corrector 700 in relation to that already provided for the corrector 124. Likewise, the chambers $129_2$ and 128 are both annular, owing to the axial arrangement of the new pistons $129_4$, $129_5$.

The embodiment of FIGURE 20 is capable of numerous alternatives without going outside of the scope of the invention.

FIGURE 21 is a diagrammatic sectional view of the coupling member 800 connectable to the member 600, with the object of algebraically superimposing on the individual distributors of control wheels, the combined actions of two acceleration detectors, for example, a transverse acceleration detector and a vertical acceleration detector.

It will actually be noticed that the vertical accelerations resulting from a change of slope or cross-drain cannot be corrected in their disturbing effects at the moment when these anomalies occur over which the vehicle is running and affect the central wheels. To have the time required for a correction substantially reducing the effects of such disturbances, their passage must be detected under the first pair of wheels. Presuming this detection is carried out correctly (and we give an illustration of detection later), liquid under pressure must be introduced into or evacuated from the suspension members of the central wheels. The coupling member 800 enables this correction to be made, combined with that required by the lateral slope in a transverse acceleration.

The member 900 is coupled, FIG. 23, of a distribution device, for adding two corrections to it and comprises, to this end, two twin staged pistons $620_2$, $602_4$ and the central piston $602_3$ defining with the fixed body $601_1$, $601_2$, $601_3$, two pairs of inversely deformable cavities $613_{1a}$, $614_{1a}$, $614_{1b}$, $613_{1b}$ with the simultaneous displacements of the twin staged pistons $602_2$, $602_4$, $602_3$ and their extensions $602_1$, 603.

One of these extensions $602_1$ is integral with an elastic recoil connection comprising the spring 144 and its bearing cups 143, 145 carried by the fixed casing $602_2$. The other extension is terminated, 603, outside the fixed body, by the cap 609. The holes of the conduits $607'_{1a}$, $608'_{1a}$, and $608_{1b}$, $607'_{1b}$ correspond to two pairs of inversely deformable spaces $613'_{1a}$, $614'_{1a}$ and $614_{1b}$, $613_{1b}$. The holes of conduits designated "b" act for the return of leakage, indispensable if the pistons do not comprise fluid-tight packing for reducing friction effects. The placement of two twin coupling members 800 on the individual correctors or distributors 100, of a pair of control wheels is shown in FIGURE 22.

The arms $3'_1$, $3'_2$ with their spindles $2'_1$, $2'_2$ and the bodies of the corresponding suspension members $6'_1$, $6'_2$, are respectively connected to the distributors $10'_1$, $10'_2$ whose slide-valves are controlled by levers $611_1$, $611_2$ driven towards the exterior of the chassis by low inertia torsion bars $4a_1$, $4a_2$ integral at their opposite ends with the levers $611_1$, $611_2$.

On the internal side of the chassis, the levers $611_1$, $611_2$ are integral with the low inertia torsion bars $4b_1$, $4b_2$ connected at their opposite ends to the levers $611_1$, $611_2$ to the levers $612_1$, $612_2$ driven by means of connecting rods by the caps 609 of the coupling members $800_1$ and $800_2$.

FIGURE 22 also shows in parallel with the conduit connecting the members $6_1$, $6_2$ and the differentiating members $100'_1$, $100'_2$, a central conduit $T_c$ uniting two throttles $E_1$, $E_2$ terminating at the suspension members $6_1$, $6_2$ and connected by one of these points between $E_1$ and $E_2$ to a cavity $CT'_{12}$ whose utility will appear hereafter and which is incorporated in FIGURE 25.

FIGURE 23 illustrates a corrector 900 for control pressures intervening in particular in the response of suspension members of pairs of end wheels of a vehicle to a longitudinal acceleration detector. In this type of response, the front pair of wheels preferably acts as control wheels in relation to the rear pair of wheels, so as to retain as far as possible, over irregular ground, a mean pressure valve permitting movement in both directions.

The response to longitudinal acceleration thus tends to retain for the pair of wheels considered, this mean pressure valve by providing for or limiting any pitching movement of the chassis in relation to the wheels that might result from the intervention or appearance of such acceleration. It should actually be remembered that to reduce fluid consumption under pressure produced by the hydraulic unit of the suspension, the feed of the correctors and or distributors, and in particular the mean distributor of the front wheels, is braked to the maximum (when there is no longtiudinal acceleration to be compensated) for it is by these means that the wheel oscillations produced by the ordinary uneven places on the road surface have a negligible effect on the consumption of high pressure fluid.

Under these conditions, contrary to what has taken place for centrifugal correction or lateral slope or slide roll, the response to longitudinal acceleration or longitudinal slope seeks only to modify the relative pressures of the front and rear suspension members.

The corrector 900 for pressure control, of FIGURE 3, enables in particular, the developing of two pressures varying inversely in relation to each other and which will be applied on either side of the longitudinal acceleration detecting mass, with a view to bringing this mass to its neutral position when the differentiation of the mean pressures of the suspension members of the front and rear wheels balances a given longitudinal acceleration. Moreover, the corrector 900 enables the correct longitudinal level position of the vehicle to be restored in the presence of a longitudinal displacement of the center of gravity, by the action of correction pressures acting in one direction or the other in relation to the respective actions of the pressures of the front and rear suspension members.

The corrector 900 for control pressure (FIG. 23) comprises a central body 901 confining, with the symmetrical staged piston 902, two annular cavities, 903, 904, inversely deformable in relation with the holes of the conduits 907, 908. There are checks $901_1$, $901_2$ on either side of the body 901 defining, with the ends of the piston 902, the annular cavities or cylinder spaces inversely deformable, 905, 906 in communication with the hopes of the conduits 909, 910.

Finally, across the piston 902 and along its axis, there is a rod 916, integral with the piston (stop screw 907) and having its ends on the inner faces of two diaphragms or bellows 918, 919 symmetrically placed. These bellows or diaphragms each define two inversely deformable spaces 920, 928 for 918 and 921, 929 for 919. Each of these spaces is connected by a conduit intake 922, 926 and 923, 927. The holes 922, 923 correspond to the pipe lines $V_{2b}$, $V_{1b}$ of a longitudinal acceleration detector. The holes 908, 910 and 902, 907 correspond to the points where the pressures of the suspension members of the front and rear wheels occur.

Finally, the holes 912, 911 enable the return of leakage fluid, if fluid-tight packing is not provided. (In this case, the correction pressures may be established by members of the hydraulic or pneumatic escape-valve type.)

Members of this type have not been described, in the case of suspension members of the control wheels when responsive to a transverse acceleration detector, for it is not desirable to effect this response by directly causing operation of the action of pressure differences in the suspension members placed on either side of the longitudinal symmetry axis owing to the elevation of the center of gravity of the suspended mass in relation to the plane of the chassis. Actually, the combination of this elevation and the side slope or roll of the chassis in relation to the wheels modifies the relative magnitude of the pressures of the suspension members situated on either side of the longitudinal axis, this pressure modification being so much the greater as the elevation ratio of the center of gravity on the track of the chassis is greater. The effect, when the vehicle slopes towards the center of the curve, tends to reduce the torque which balances the centrifugal forces, whereas, when the vehicle slopes towards the exterior of the curve, the same torque is increased. It will thus be seen in this condition that a correct response between a slope towards the center of the curve and the centrifugal force due to the curve, cannot be effected by utilizing, as control pressure for the detecting mass of transverse acceleration, the pressures of the wheel-holder members situated on either side of the longitudinal axis.

On the other hand, in the case of correction of longitudinal accelerations, the elevation ratio of the center of gravity added to the wheel-base (distance between axles) is much more reduced, and the disturbing effect which has just been examined above, can, in many cases, be ignored. It is obvious that it were not so, the arrangements provided for correcting centrifugal effects are applicable to the correction of longitudinal accelerations.

FIGURE 24 shows an example of a vertical acceleration detector $625c$. This vertical acceleration detector $625c$ comprises three parts united by two twin elements $811_1$, $811_2$. The two end parts each contain a vertical acceleration detecting mass $804_1$, $804_2$ pivoted around a horizontal spindle $805$, $805$ (the plane of the chassis being itself presumed to be horizontal) perpendicular to the plane of the figure, itself parallel to the plane of symmetry of the chassis. These masses are connected together by pairs of rods or cables $809_1$, $810_1$, $809_2$, $810_2$, two L-iron reverse levers $807_1$, $807_2$; the cables or rods move in a reverse direction, owing to the L-iron reverse levers $807_1$, $807_2$, when the detecting masses $804_1$, $804_2$ oscillate around their respective spindles, so that their angular movements are in the same direction and preferably identical.

The L-iron reverse levers $807_1$, $807_2$ are pivoted on the spindles $808_1$, $808_2$ parallel to the spindles of the detecting masses $804_1$, $804_2$. The reverse lever $807_2$ comprises a slot $807_3$ for the passage of the rod $810_2$. The detecting masses $804_1$, $804_2$ or the levers which are integral with them $806_1$, $806_2$ are subjected to the opposing action, on the one hand, of two pistons (placed vertically in the case of the figure) $801_1$, $801_2$ and comprising small bearing connecting rods $803_1$, $803_2$, on the other hand, a piston $802$ (placed horizontally in the example of the figure) of which the connecting rod $803_3$ is applied to the lever $806_2$ integral with the right-hand detecting mass $804_2$. The detecting masses $804_1$, $804_2$ are placed on either side of the center of gravity of the suspended mass, preferably at the distances $m$, $n$, from the center of gravity, measured along the longitudinal axis of the chassis, complying with the conditions $m \cdot n = K^2$ in which $K^2$ designates the square of the gyration radius of the suspended mass oscillating around the transverse axis passing through the center of gravity, generally one of the principal inertia axes due to symmetry. The front detecting mass $804_1$ is, in principle, placed flush with the axle of the first pair of wheels (starting from the front) of the vehicle, due to the particular part played by this first pair of wheels in detecting serious anomalies of the road surface, such as changes of slopes, cross-drains, depressions, and the like. The first pair of wheels thus acts, from the standpoint of compensating vertical accelerations, the part of control wheels.

In order that the effects of an abrupt overload or discharge at the level of said front wheels set up a minimum of disturbances for the suspended mass, it is advisable that the resultant of the loads taken at rest by the other pairs of wheels of the vehicle should pass in the vicinity of the second detecting mass $804_2$ situated at the $n$ distance from the latter.

For the vertical acceleration detector $625c$ to be unaffected by the effects of pitching oscillation, it is also necessary that the detecting masses $804_1$, $804_2$ should exert, when at rest, on the rod system that they receive from actions inversely proportional to their respective distances $m$ and $n$ to the center of gravity.

In particular, if the detecting masses are pivoted and connected by identical members, their center of gravity being the same distance from their respective oscillation axes and similarly placed, their respective masses must be, in this case, positioned inversely to their respective distances from the center of gravity. They are thus impelled, by pitching oscillation around the transverse axis passing through the center of gravity, in a manner contrary one to the other so that the detector, on the whole, remains insensitive or non-responsive to such effects.

In the rest position, the masses $804_1$, $804_2$ are actually returned to a horizontal position by at least one adjustable elastic connection. A connection of this kind can, for example, be made of a torsion bar coinciding or in line with the articulation axis to the casing of one of the detecting masses of the vertical acceleration detector.

At an intermediate point, rods $809_1$, $810_2$ of the detecting masses, there is a double slide-valve distributor $812$, $813_1$, $813_2$ which forms part and parcel with one or other of the conjugating rods (and hence, moves in an opposite direction).

The lower slide-valve $813_1$ comprises two symmetrically placed grooves $814_1$ and $814_2$ and controls two conduits $U_1$, $U_2$. The upper slide-valve $813_3$ establishes, by means of four grooves $815_1$, $815_2$, $815_3$, $815_4$, a passage respectively between the holes of the conduits $S_1$ and $T_1$ on the one hand, and $S_1$ and $T_1$ on the other, every time that this slide-valve is diverted from its middle position corresponding to the balanced position under load at rest of the detecting masses. An initial pressure connection comprising the springs $144_1$, $144_2$ is placed on each of the slide-valves $813_1$, $813_2$ to hold them or return them to their middle position, so long as the detecting masses $804_1$, $804_2$ are not subjected to stresses exceeding a predetermined value (operational threshold).

The device works in the following manner:

The left-hand detecting mass $804_1$ is placed approximately flush with the front pair of wheels, records the accelerations corresponding to serious and rapid displacements imposed on the first pair of wheels of the chassis by passing over an obstacle, such as a road-drain and the like.

As previously stated, the arrangement of two detecting masses coupled to the distances $m$ and $n$ of the center of gravity under load, makes them insensitive to pitching oscillations, because in the case of these oscillations, they are impelled in opposition with regard to one another. The control having the object, for example, in the case of running the front wheels over an obstacle jutting out, or lifting the central and front wheels in advance so as to communicate to the center of gravity, a vertical displacement reducing the overload of the central wheels at the moment when the obstacle comes below them. The pressures opposing the displacement of the detecting masses due to acceleration effects on the front mass are obtained by operating the difference between the present pressure in the suspension members of the control wheels (holes $V_{1c}'$, $V_{2c}'$) and that of the mean balancing pressure of a reference area by the hole $V_{2c}$. The reference area $CT_{12}$ (in FIGURE 22) is connected to the suspension members of the control wheels by the throttled passages $E_1$ and $E_2$.

FIGURE 25 is a diagrammatic perspective view of an eight-wheeled vehicle chassis, comprising individual suspension members statically determined for reaction, arranged, according to the invention, by means of longitudinal and transverse differentiating correctors, also comprising response devices for control wheels.

FIGURE 29 is a diagram of the elements and conduits of a suspension system for a vehicle with four pairs of wheels $1_1$, $1_2$—$1'_1$, $1'_2$—$1''_1$, $1''_2$ and $1'''_1$, $1'''_2$. In this figure, the same captions as in FIGURES 27 and 28 are used for denoting the conduits for control, utilization, low and high pressure.

The central wheels $1'_1$ and $1'_2$ which are adjacent to the transverse plane containing the center of gravity, are control wheels from the standpoint of rolling and the vertical movement of the suspended mass. They are also associated with the wheels $1''_1$ and $1''_2$ by direct interconnection of the suspension members $6'_1$, $6''_2$ on the one hand, and $6'_1$, $6''_2$ on the other.

The wheels $1_1$ and $1_2$ which preferably correspond to the front wheels of the vehicle are control wheels for pitching movements and for vertical displacements of the suspended mass.

The wheels $1'_1$, $1'_2$, which are control wheels from the standpoint of rolling and vertical movements, have individual distributors $10'_1$, $10'_2$, and the wheels $1_1$, $1_2$, which are control wheels from the standpoint of pitching and vertical movements, have a distributor $10$.

The wheels $1_1$, $1_2$ (front wheels) and $1'''_1$, $1'''_2$ (rear wheels) are responsive in rolling through the correctors $100$ and $100'''$, to the wheels $1'$, $1'$.

The wheels $1'''_1$, $1'''_2$ and $1'_1$, $1'_2$ are associated from the standpoint of pitching and vertical movements with the wheels $1_1$, $1_2$ and $1'''_1$, $1'''_2$ through the corrector $700$.

Regarding rolling movement, suppose that due to a slide slope, the suspended mass tends to tilt to the right-hand side. The load on the wheels $1'_2$, $I''_2$ is thus increased, whereas that on the wheels $1'_1$, $1''_1$ is reduced to a similar extent.

The deflection of the arms of the wheels $1'_2$, $1''_2$ accompanies a forward displacement of the piston of the individual distributor $10'_2$ and inversely for the wheels $1'_1$, $1''_1$ of the displacement of the piston of the individual distributors $10'_1$ towards the rear.

On this account, the liquid under pressure is admitted into the suspension members $6'_2$, $6''_2$ and is evacuated outside of the suspension members $6'_1$, $6''_1$.

Concurrently, by the action of the correctors $100$ and $100'''$, the same fluid distributions coming from the high pressure circuit or going to the tank are effected at the level of the front wheels $1_1$, $1_2$ and the rear wheels $1'''_1$, $1'''_2$, as was described in FIGURE 27 associated with FIGURES 4 and 5. The relative distributions of loads between the wheels on the same side of the vehicle are appreciably independent of the flatness of the ground on which they rest.

Seeing that only the wheels $1'_1$, $1''_2$ have individual distributors and that the front wheels $1_1$, $1_2$ have only one mean distributor $10$, only the pressure in the suspension members of the other wheels is not applied, and they are thus free to rest on the ground in any way.

Regarding the pitching movement, suppose there is an increase of the loads borne by the wheels $1_1$, $1_2$ accompanied by a correlative reduction of the loads borne by the other wheels (such a case can result, for instance, from the general slope of the road combined with the elevating of the center of gravity of the vehicle suspended above the ground).

The wheels $1_1$, $1_2$ tend to recede into their housing, provided in the body of the vehicle. The piston of the disributor $10$ moves towards the rear, and the liquid is admitted into the conduit $15$ which is connected to the corrector $100$ (in accordance with the indications of FIGURES 3, 4 and 5).

This flow of liquid under pressure through the corrector $100$ and into the suspension members $6'_1$, $6'_2$ tends to bring the wheels $1_1$, $1_2$ into their mean equilibrium position.

If, moreover, the center of gravity of the suspended mass is only slightly removed from the transverse plane containing the centers of the wheels $1'_1$, $1'_2$, the responsive conditions of these wheels are slightly increased by the slope of the ground and the mean pressure on the suspension members $6'_1$, $6'_2$ of these wheels $1'_1$, $1'_2$ varies slightly.

Therefore, the slide-valve $130a$ of the longitudinal differentiating member $70$ (FIGURE 20) which is impelled from bottom to top in the case of FIGURE 28, by a force that only varies slightly, due to the mean pressure in the members $6'_1$, $6'_2$ acting through the conduits $6'_a$, $6'_b$ and which is impelled in an opposing manner by the mean pressure of the increasing values in the members $6'_1$, $6'_2$ through the conduits $6_a$, $6_b$ tend to move downwards in the FIGURE 29. This movement enables the evacuation through the conduit $71$ of the suitable quantity of liquid taken from the suspension members $6'''_1$, $6'''_2$ of the rear wheels $1'''_1$, $1'''_2$.

In the case of an opposite disturbance, it is through the conduit $72$, also connecting the corrector $700$ (FIGURE 20) to the corrector $100'''$, that a contribution of liquid under pressure would take place on behalf of the suspension members $6'''_1$, $6'''_2$ of the rear wheels $1'''_1$, $1'''_2$.

In the case of a vertical movement of the suspended mass, it is ascertained that, by the action of the individual distributor $10'_1$, $10'_2$ and the distributor $10$ in combination with the corrector $700$, the suspension is also returned towards its equilibrium position by the controlled admission or evacuation of the liquid under pressure in the various suspension members, whatever the shape of the ground.

We thus see that in the case of pitching, as in the case of vertical movement of the center of gravity, the corrector $700$ defines the mean pressure prevailing in the suspension members of the rear wheels $6'''_1$, $6'''_2$. To do this, the slide valve $130a$ of the corrector $700$ in FIGURE 20 is impelled from left to right, by the action of pressures prevailing in the suspension members $6'_1$, $6'_2$ transmitted to the corrector $700$ by the pipe lines $6'_a$, $6'_b$, the one, $6'_a$ acting on the annular chamber $128$ and the other $6'_b$ acting in the annular chamber $129b$.

The slide-valve $130a$ is, on the other hand, impelled from right to left, by the two pistons $137$ and $136$ acting on the plate $135$ in abutment on the slide-valve $130a$.

The pistons $137$ and $136$ are subjected to the pressure of the suspension members $6_1$, $6_2$ coming from the front wheels through the pipe lines $6a$, $6b$.

In a plane perpendicular to the plane of FIGURE 20, two pistons similar to the pistons $136$ and $137$ transmit to the plate $135$ forces proportional to the pressures prevailing in the members $6'''_1$, $6'''_2$ and transmitted to the corrector $700$ through the conduits $6'''_a$, $6'''_b$ (FIGURE 29).

It follows that in a pitching movement the oscillations directed from left to right on the slide-valve $130_a$ are due to the mean pressure of the suspension members of the wheels $1_1$, $1_2$. Since these pressures vary little, the slide-valve $131$ will only be in balance to the extent that an increase of pressure in the members of the wheels $1_1$, $1_2$ is compensated, by a pressure reduction in the suspension members of the wheels $1'''_1$, $1'''_2$ or vice versa.

Supposing that the pressure in the suspension members $6_1$, $6_2$ of the front wheels $1_1$, $1_2$ undergoes an increase, the slide-valve $130a$ will move from right to left, the port $131$ puts the conduit $71$ into communication with the tank B, and the conduit $71$ which through the corrector $100'''$ withdraws liquid coming from the suspension members $6'''_1$, $6'''_2$ (see FIGURE 5).

Conversely, if the mean pressure in the suspension members $6_1$, $6_2$ underwent a reduction, the slide-valve $130a$ would move to the right and the conduit $72$ would come into communication with the fluid intake under pressure.

The liquid traveling through the conduit $72$ and passing through the corrector 100''' would go into the suspension members 6'''₁, 6'''₂ to increase the pressure prevailing in those members.

In the case of a vertical movement of the suspension, the slide-valve 130a would be impelled from left to right by the increase of mean pressures in the members 6'₁, 6'₂ at the same time that the pressure of the members 6'₁, 6'₂ would increase by the parallel action of the distributor 10 and the ratio between the increases that must be retained, due to the geometry of the corrector 700, the slide-valve of that member would supply fluid under pressure to the members 6'''₁, 6'''₂ and vice versa.

We thus see that in the case of FIGURE 29 the corrector 700 intervenes for modifying the pressures prevailing in the suspension members 6'''₁, 6'''₂ as well as in the case of vertical displacements of the suspended mass and for the pitching oscillations of that mass.

The corrector also comprises other arrangements enabling corrections to be made as a function of the distribution of loads on the vehicle, the corrections having the effect of modifying the relations established by the corrector 700 between the mean pressure in the members 6'''₁, 6'''₂ and the pressures of the other members.

This correction is profitable, for the slide-valve 130a of the corrector 700 (FIGURE 20) occupies its middle rest position when the pressures that are exerted on the annular and central chambers 128 and 129₂ balance the pressures acting on the pistons 137b and 136b.

Under these conditions, the vehicle being on the ground with a horizontal plane, the distribution of loads between the various contact points of the wheels and ground corresponds to normal theoretical load conditions.

If the vehicle comprises a load distribution differing from the foregoing, the distribution of loads on the wheels can be re-established that best corresponds to the type of loading by adding to the play of the above-mentioned opposing pressures, a suitable axial thrust coming from the left or right (FIGURE 20). This thrust can be transmitted by means of pistons 129₃ or 129₄ on which fluids can act coming from adjustable mechanical or hydraulic pressure reducers, respectively terminating at the holes PC₁ or PC₂.

If the suspension in question were limited to the above-mentioned members, it would be desirable for maintaining the relative distribution of the loads on the wheels of the vehicle on a sloping road, automatically to establish the pressure of correction enabling the disturbing effects of the slope of the road to be compensated on this distribution.

We shall not give an example of automatic control of these pressures on such a gradient, because a complementary member will be described illustrated in FIGURE 29 intended to provide an automatic solution for this longitudinal stabilization problem in the presence of a slope or an acceleration on the trajectory followed by the vehicle.

The suspension system of FIGURE 29 also comprises examples of controls of longitudinal, transverse and vertical accelerations.

Longitudinal acceleration control comprises a longitudinal acceleration detector 625$_b$ in FIGURE 29.

This corrector is of the type of one or other of those described in FIGURE 13 or FIGURE 16 with reference numeral 351.

It comprises a distributor supplying two utilization conduits $U_{1b}$, $U_{2b}$ which are such that for a displacement without the effect of a longitudinal acceleration of the mass 274 to the left, the conduit $C_{2b}$ is supplied with liquid under pressure whereas the conduit $U_{1b}$ is put into communication with the tank B according to sections which increase with the amplitude of the displacement of the mass and vice versa.

Moreover, the mass is returned to its equilibrium position by means of needles or push-rods on which the liquid under pressure acts, conveyed through the conduits $V_{1b}$, $V_{2b}$, which are respectively connected to the terminal conduits of the corrector 900.

The conduits $U_{1b}$ and $U_{2b}$ terminate at the longitudinal coupling member 600 (FIGURE 18) which is a double-acting piston cylinder effecting the coupling of longitudinal inertia on the distributor 10 of the control wheels 1₁, 1₂.

The distributor 10, by the pendulum Z and small connecting rods J₁ and J₂ and the vertical levers 611₁, 611₂ are connected to the wheel-holder members 2₁, 2₂ by the tension bars 4$_{a1}$, 4$_{a2}$.

Moreover, the piston of the longitudinal coupling member 500, by its piston rod and vertical lever 610, exerts a torsion force on the bars 4$_{b1}$, 4$_{b2}$ which are connected by their opposite ends either 610 to the levers 611 and 612 in the extension of the bars 4$_{a1}$ and 4$_{a2}$.

The differentiating member of the pressure controls 900 (FIGURE 23) has the effect of revealing the pressure differences between the holes 922 and 923 where the conduits $V_{1b}$, $V_{2b}$, terminate, which are connected with the pressures prevailing in the suspension members 6₁ and 6₂ on the one hand, and 6'''₂ and 6'''₁ on the other.

Finally, the corrector 900 also comprises holes 926, 927 enabling pressure corrections to act whose actions are crossed in relation to those due to the pressures of the members 6₁ and 6₂ on the one hand and 6'''₁ and 6'''₂ on the other. These pressures can be utilized in conditions similar to the pressures to which we have referred for the holes PC₁, PC₂ of the corrector 700.

The working is as follows: we suppose that the displacement of the mass 274 is due to a longitudinal acceleration, for example, braking (negative acceleration). This mass 274 then moves towards the front of the vehicle and consequently to the left in the case of FIGURE 29.

The conduit U₂ is in communication with the source HP whereas the conduit U₁ is in communication with the tank B. The piston 602 of the coupling member 600 moves to the right and by the action of the lever 610 perpendicular to the plane of these figures, the torsion bars 4$_{b1}$ and 4$_{b2}$ exert a torque which, transmitted to the pendulum Z tends to move the piston 11 of the distributor 10 to the right.

The displacement of the piston 11 to the right entails the admission of liquid under pressure into the pipe line 15 which, through the corrector 100 tends to raise the pressure in the suspension members 6₁ and 6₂.

By the mechanism of the corrector 700 (FIGURE 20) eventually taking into account slight variations in the suspension members 6'₁, 6'₂ and 6''₁, 6''₂ of the front wheels, the pressure in the suspension members of the rear wheels will diminish and a torque tend to raise the front of the vehicle while lowering its rear, tending to bring the vehicle into its normal position in relation to the contact surface of the wheels and the ground.

The dimensioning of the annular and central surfaces of the staged piston of the corrector 900 for control pressures (FIGURE 23) and the sections of the rods that return the mass of the longitudinal acceleration detector to its rest position are such, for the mass of a normal load, that the hold of the road of the vehicle is re-established at the moment when the mass 274 resumes its rest position by closing the end of the conduits U₁ and U₂ with regard to the member 625b.

Transverse accelerations control includes a transverse acceleration detector 625a. This detector is of the type of one or other of those described in FIGURE 13 or FIGURE 16 with the reference numeral 351. The chassis resting on horizontal ground is illustrated in FIGURE 29 turned back on the plane of the figure for a better understanding of the drawing.

A distributor supplies conduits $U_{1a}$, $U_{2a}$, which are such that for a displacement of the mass 274 downwards under the effect of a transverse acceleration the conduit $U_{2a}$ is supplied with liquid under pressure whereas the conduit $U_{1a}$ is put into communication with the tank B.

Moreover, the mass 274 is returned to its equilibrium position by means of rods, on which the liquid under pressure has acts by communication through the conduits $V_{1a}$ and $V_{2a}$ which are respectively connected to the conduits $U_{1a}$ and $U_{2a}$.

The conduits $U_{1a}$ and $U_{2a}$ both terminate at the coupling members $800'_1$ and $800'_2$ (FIGURES 29 and 21). The conduit ends on the member $800'_1$ on the right of the annular piston $602_3$ of larger diameter whereas on the member $800'_2$ it ends on the left of this same piston of larger diameter.

In like manner, the conduits terminates on the coupling member $800'_1$ to the left of the larger diameter piston and on the coupling member $800'_2$ to the right of the larger diameter piston.

It is thus that the response of the coupling member $800'_1$ and $800'_2$ to the transverse acceleration detector $625a$ is effected by the pipe lines $U_{1a}$, $U_{2a}$ and has the effect of modifying the keying of the lever perpendicular to the plane of the table of FIGURE 29 controlling the individual distributors $10'_1$, $10'_2$ for one and the same position of the wheels $1'_1, 1'_2$.

Thus, this mode of control has the effect of developing a rectifying torque in opposition to the disturbing action detected by the detector $625a$.

For example, suppose that the mass 274 of the member $625a$ is impelled downwards in the case of FIGURE 29.

The conduit $U_2$ (in mixed lines) is put into communication with the intake of liquid under pressure to the detector $625a$ (said intake being shown by dotted lines).

This conduit $U_2$ terminates at the coupling member $800'_1$ to the left of the larger diameter piston and tends to move this piston to the right, the other face of the larger diameter piston being connected to the conduit $U_1$ conveyed to the tank in the detector $625a$ for the presumed displacement of its detecting mass.

In its movement to the right, the piston of the coupling member $800'_1$ by its gear $603_1$ twisting the leaf $4b_1$ tends to move the piston of the individual distributor $101'$ to the right which admits liquid under pressure to the conduit connecting it to the suspension members $6''_1, 6'_1$. The wheels $1''_1$ and $1'_1$ tend to emerge from their housing and oppose the action of transverse acceleration which tends to lower the suspension on the side of the wheels 1. In like manner, the connection to the coupling member $800'_2$ of the conduits $U_{1a}$ and $U_{2a}$ being inverted, it is immediately ascertained that the conduits $U_2$ being supplied with liquid under pressure, and U, taken to the tank B, the piston of the coupling member $800'_2$ tends to move to the left, producing, by twisting the leaf $4b_2$, (the inverse of that of the bar $4b_1$ in the same conditions), an evacuation of liquid, coming from the suspension members $6'_2, 6''_2$, through the individual distributor $10'_2$. This action on the suspension members of the wheels $1'_2$, $1'''_2$, directed in an inverse sense to the action which impels the wheels $1'_1, 1''_1$, forms a torque opposing the rolling movement set up by the transverse acceleration detected by detector $625a$. For a movement in the opposite direction of the detecting mass of the detector $625a$, the corrective actions that have just been analyzed would naturally be reversed.

When the torque righting the vehicle (or sloping it towards the incurve center or against a side slope) reaches a predetermined value recognized as the most favorable, the pressure prevailing in the transverse control conduits supplied with liquid under pressure brings the detecting mass to the rest position by the action opposing the detected acceleration exerted on the mass of the detector $625a$ for the needles of the push-rod connected respectively to the conduits $U_1$ or $U_2$ put under pressure, by the conduits $V_1$, $V_2$.

The vertical acceleration detector $625c$ shown in detail in FIGURE 24 comprises two detecting masses $801_1$, $801_2$, oscillating around two transverse axes (in relation to the plane of symmetry of the vehicle) preferably situated, the first flush with the pair of front wheels $1_1$, $1_2$ at the distance $m$ from the center of gravity of the suspended mass of the vehicle, the second to the rear of this center of gravity and at the distance $n$ from the latter. (It is advantageous that the product $m$ should be in the vicinity of the square root of the turning radius of the suspended mass in rotation around its main transverse inertia axis.)

The two masses $801_1$, $801_2$ are interconnected by lever and rod and their oscillations are coupled and in the same direction, so that they are not influenced in their oscillations by a pitching movement of the suspended mass.

Their weight is balanced by a spring, for example, by using at least one torsion bar acting as an oscillation spindle. The rods interconnecting the masses $801_1$, $801_2$, entail, in their movements in respectively opposite directions, two slide valves $813_1$, $813_2$. The slide-valve $813_2$ has the object of reducing the delays by rolling of the circuits of the distributors $10'_1$, $10'_2$ and the distributor 10, by substituting for the values adopted for these delays when normally working, lower values when vertical acceleration correction comes into action. In the first place, the slide-valve $811_1$ supplies one or other of the conduits $U_{1c}$, $U_{2c}$ with liquid under pressure, and in the second place, connects the conduits $U_{1c}$, $U_{2c}$ to the tank, in a similar manner to the arrangements adopted for the elements $625a$ and $625b$.

In a manner opposing vertical acceleration (downwards) which impels the two detecting masses $804_1$, $804_2$, two pistons $801_1$, $801_2$ respectively connected with the mechanically deformable spaces of the suspension members $6'_2$, $6'_1$ (FIGURE 29) exert on these detecting masses a total action upwards proportional to the mean pressure in said members $6'_1$, $6_{22}$.

Finally, in an opposite manner to the preceding one, and balancing it when at rest, a piston $803_3$ connected with a cavity $CT'_{12}$ acts on the detecting mass $804_2$ (and hence, on $804_1$ seeing that both are integral in their movements). The cavity $CT'_{12}$ is connected by two thin narrowed nozzles to the mechanically deformable spaces of the suspension members $6'_1$, $6'_2$.

The conduits $U_{1c}$, $U_{2c}$ are connected on the one hand to the inversely deformable spaces formed by the mobile double-acting piston in the cylinder of the coupling member 600 to the gear of the distributor 10 and on the other hand, to the twin annular chambers of intermediate diameter of the members $800'_1$, $800'_2$, without intervention, i.e., that the intermediate diameter annular chambers to the left of the members $800'_1$, $800'_2$ are, in the case of FIGURE 29, connected at $U_{1c}$ and the right-hand corresponding chambers of the members $800'_1$ and $800'_2$ are connected at $U_{2c}$. Lastly, an initial threshold tension link $144_2$, $144_1$ FIGURE 24 only permits movements of the slide-valves to either side of their rest positions for disturbing actions exceeding a selected minimum.

When the vehicle is running normally, the differences of the mean pressures in the members $6_1$, $6_2$ on the one hand, and in the reference cavity $CT_{12}$, on the other, are sufficiently slight and brief so that the detector $625c$ does not intervene.

If, on the other hand, as may occur in the case of a sudden load loss, the front wheels undergo a sudden pushing into or emerging from their housing during a time interval, for example, of about 12 wheel rotations or more, the mass $804_1$ is impelled and moves the slide-valves $813_1$, $813_2$. Supposing, for example, that the front wheels $1_1$, $1_2$ enter into their housing, the pressure in the members $6_1$, $6_2$ increases owing to the increased vertical reaction of the suspension members $6_1$, $6_2$, the detecting mass $804_1$ lowers, the action of the distributors is made more rapid by the movement of the slide-valve $813_2$ to the right which sets up passageways S—T and S—T partially short-circuiting the ordinary relays. The movement of the slide-valve $813_1$ to the left determines the putting into communication of $U_{1c}$ with the source HP and $U_{2c}$ with the tank B.

The liquid under pressure brought by $U_{1c}$ into the mean dimension annular chambers of the left side of the staged pistons of the members $800'_1$, $800'_2$ moves these pistons to the right and by torsion of the bars $4b_1$, $4b_2$ offsets the slide-valves of the individual distributors $10'_1$, $10'_2$ which admit liquid under pressure to the mechanically deformable spaces of the suspension members $6'_1$, $6'_2$ and $6''_1$, $6''_2$.

The suspended vehicle thus tends to rise, for the corrector 700 which defines the mean pressure in the mechanically deformable spaces of the suspension members of the rear wheels $1'''_1$, $1'''_2$ maintains the balance on the one hand, between the pressure in the mechanically deformable spaces of the central wheels $1'_1$, $1'_2$ and $1''_1$, $1''_2$ and on the other, by a linear combination (in positive terms) of pressures prevailing in the mechanically deformable spaces of the suspension members of the wheels $1'''_1$ and $1'''_2$ and the front wheels $1_1$, $1_2$. Consequently, any increased pressure of the members of the central wheels, following a decided increase of the pressures of the members of the front wheel will set up a pressure increase in the suspension members of the rear wheels $1'''_1$, $1'''_2$.

The detecting masses resume their rest position at the end of a time lag which depends on the extent of the unevenness crossed and the values of the adjustable throttles $E'_1$, $E'_2$ through which the cavity $CT'_{12}$ is connected to the mechanically deformable spaces of the suspension members of the central wheels $1'_1$, $1'_2$ and $1''_1$, $1''_2$.

Likewise, in the case of a road surface anomaly in the opposite sense to that which has just been considered, the conduit $U_{2c}$ is put into communication with the source HP whereas the conduit $U_{1c}$ is put into communication with the tank B, the device controlled by $625c$ producing a general lowering, principally of the suspended vehicle, as a function of the extent of the anomaly afforded by the road surface and the values of the adjustable throttles $E'_1$, $E'_2$.

FIGURE 26 is a diagrammatic illustration of the invention applied to a tractor and its semi-trailer. A deceleration GK results in an inertia force which shifts the weight GP of the semi-trailer according to GP' and produces a lightening F'' at the level of the wheels, at the rear of the semi-trailer and an overload F' at the bearing level pivoting the semi-trailer on the tractor. It follows that when braking the tractor receives a checking torque from its two, which can be predominant on the driving torque due to its own inertia. It is clear that by limiting the example of FIGURE 25 to the two pairs of wheels $1_1$, $1_2$ and $1'_1$, $1'_2$ and by modifying the connections of the members $800'_{1b}$, $800'_{2b}$ to the detector $625b$ with a correct verifying of the low inertia torsion bars, the resultant effect can readily be corrected. On the other hand, considering the assembly of the tractor and its trailer, the system of FIGURES 25 and 29 may be adapted to it, with suitable adjustments of the control elements.

What I claim is:

1. In a vehicular suspension system containing a liquid, a chassis, at least four wheel holders articulated to said chassis in pairs at opposite sides of said chassis, at least two control wheels and at least two controlled wheels, each one of said control wheels and each one of said controlled wheels being suspended from the free end of a corresponding one of said wheel holders and thereby supported by said wheel holders, a plurality of suspension members, each of said suspension members comprising a cylinder constituting a first major element of the device and a piston slidably mounted in the cylinder and thereby defining with the cylinder a mechanically adjustable space in the cylinder, said piston constituting a second major element of the device, said space being adapted to contain the liquid, one of said major elements being coupled to the chassis and the other of said major elements being coupled to one of said wheel holders, a plurality of buffer devices, each one of said buffer devices communicating with a corresponding one of said mechanically adjustable spaces and being adapted to control entry and exit of the liquid in the mechanically adjustable space, a source of the liquid under pressure, a tank, interconnection means communicating between the source and the tank and between the source and the mechanically adjustable spaces, said interconnection means including a differential corrector and a distributor, said distributor including means for transmitting to the differential corrector the sum of the pressures existing in the mechanically adjustable spaces associated with the wheels at one side of the chassis and for transmitting to the distributor in opposition to the preceding pressure sum the sum of the pressures existing in the mechanically adjustable spaces associated with the wheels at the other side of the chassis, said last-mentioned means for transmitting including a single elastic diaphragm against opposed sides of which said pressure sums oppose each other, conduit means for releasing pressure from the mechanically adjustable spaces through the distributor and the differential corrector to the tank, and conduit means for transmitting pressure from the source of the liquid under pressure through the distributor and the differential corrector to the mechanically adjustable spaces, whereby the differential corrector draws off the liquid from one of the mechanically adjustable spaces associated with one of the wheels at one side of the chassis and adds it to the mechanically adjustable space associated with another wheel at the same side of the chassis to equalize the pressures in said two last-mentioned mechanically adjustable spaces.

2. A vehicular suspension system according to claim 1, in which said distributor includes a slide valve operatively connected to said elastic diaphragm.

3. A vehicular suspension system according to claim 2, in which said differential corrector includes a pair of opposed pistons.

References Cited by the Examiner

UNITED STATES PATENTS

| | | | |
|---|---|---|---|
| 2,184,202 | 12/1939 | Tschanz | 280—104 X |
| 2,593,040 | 4/1952 | Lloyd | 280—104 |
| 2,828,138 | 3/1958 | Brueder | 280—104 X |
| 3,032,349 | 5/1962 | Fiala | 280—104 |
| 3,083,033 | 3/1963 | Fiala | 280—104 |

MILTON BUCHLER, *Primary Examiner.*

BENJAMIN HERSH, *Examiner.*

W. MARCONTELL, M. S. SALES, *Assistant Examiners.*